(12) United States Patent
Kumta et al.

(10) Patent No.: US 10,944,114 B2
(45) Date of Patent: Mar. 9, 2021

(54) HIGHLY ACTIVE, ROBUST AND VERSATILE MULTIFUNCTIONAL, FULLY NON-NOBLE METALS BASED ELECTRO-CATALYST COMPOSITIONS AND METHODS OF MAKING FOR ENERGY CONVERSION AND STORAGE

(71) Applicant: University of Pittsburgh—Of the Commonwealth System of Higher Education, Pittsburgh, PA (US)

(72) Inventors: Prashant N. Kumta, Pittsburgh, PA (US); Prasad P. Patel, Pittsburgh, PA (US); Moni K. Datta, Pittsburgh, PA (US); Oleg Velikokhatnyi, Pittsburgh, PA (US); Prashanth J. Hanumantha, Pittsburgh, PA (US); Ramalinga Kuruba, Pittsburgh, PA (US); Shrinath Ghadge, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 149 days.

(21) Appl. No.: 15/776,092

(22) PCT Filed: Dec. 12, 2016

(86) PCT No.: PCT/US2016/066098
§ 371 (c)(1),
(2) Date: May 15, 2018

(87) PCT Pub. No.: WO2017/100743
PCT Pub. Date: Jun. 15, 2017

(65) Prior Publication Data
US 2018/0331369 A1 Nov. 15, 2018

Related U.S. Application Data

(60) Provisional application No. 62/265,503, filed on Dec. 10, 2015.

(51) Int. Cl.
H01M 4/90 (2006.01)
H01M 4/88 (2006.01)
(Continued)

(52) U.S. Cl.
CPC ......... *H01M 4/9016* (2013.01); *H01M 4/881* (2013.01); *H01M 4/8825* (2013.01);
(Continued)

(58) Field of Classification Search
CPC .. H01M 4/9016; H01M 4/881; H01M 8/1018; H01M 8/08; H01M 8/1233; H01M 4/8825; B01J 27/135; B82Y 30/00
See application file for complete search history.

(56) References Cited

U.S. PATENT DOCUMENTS

| 2008/0280190 | A1* | 11/2008 | Dopp | H01M 4/8657 |
| | | | | 429/494 |
| 2011/0160045 | A1* | 6/2011 | Hwang | B01J 21/18 |
| | | | | 502/167 |

(Continued)

OTHER PUBLICATIONS

Rios et al., "Electrocatalysis of oxygen reduction on CuxMn3-xO4 (1.0< x<1.4) spinel particles/polypyrrole composite electrodes," Oct. 2008, International Journal of Hydrogen Energy, vol. 33, Issue 19, pp. 4945-4954. (Year: 2008).*

(Continued)

*Primary Examiner* — Ula C Ruddock
*Assistant Examiner* — Matthew W Van Oudenaren
(74) *Attorney, Agent, or Firm* — Eckert Seamans Cherin & Mellott LLC; Carol A. Marmo

(57) ABSTRACT

The invention provides noble metal-free electro-catalyst compositions for use in acidic media, e.g., acidic electrolyte.
(Continued)

The noble metal-free electro-catalyst compositions include non-noble metal absent of noble metal. The non-noble metal is non-noble metal oxide, and typically in the form of any configuration of a solid or hollow nano-material, e.g., nanoparticles, a nanocrystalline thin film, nanorods, nanoshells, nanoflakes, nanotubes, nanoplates, nanospheres and nanowhiskers or combinations of myriad nanoscale architecture embodiments. Optionally, the noble metal-free electro-catalyst compositions include dopant, such as, but not limited to halogen. Acidic media includes oxygen reduction reaction (ORR) in proton exchange membrane (PEM) fuel cells, and direct methanol fuel cells and oxygen evolution reaction (OER) in PEM-based water electrolysis and metal air batteries, and hydrogen generation from solar energy and electricity-driven water splitting.

6 Claims, 12 Drawing Sheets

(51) Int. Cl.
*H01M 8/08* (2016.01)
*H01M 8/1233* (2016.01)
*H01M 8/1018* (2016.01)
*B01J 27/135* (2006.01)
*B82Y 30/00* (2011.01)

(52) U.S. Cl.
CPC ............ *H01M 8/08* (2013.01); *H01M 8/1018* (2013.01); *H01M 8/1233* (2013.01); *B01J 27/135* (2013.01); *B82Y 30/00* (2013.01); *Y02E 60/50* (2013.01)

(56) References Cited

U.S. PATENT DOCUMENTS

| | | | |
|---|---|---|---|
| 2014/0045678 A1* | 2/2014 | Kumta | ................... B01J 27/135 502/1 |
| 2014/0271388 A1* | 9/2014 | Nazarpoor | ........... B01J 23/8892 422/170 |

OTHER PUBLICATIONS

Datta et al., "High performance robust F-doped tin oxide based oxygen evolution electro-catalysts for PEM based water electrolysis," 2013, J. Mater. Chem. A., 1, 4026-4037. (Year: 2013).*

Du, Xiaru et al., "Water gas shift reaction over Cu—Mn mixed oxides catalysts: effects of the third metal," Fuel Processing Technology, 2008, vol. 89, No. 2, pp. 131-138, See abstract and pp. 131-133.

Clarke, Tomos J., "Preparation of copper manganese oxide catalysts and their application for oxidation reactions," Cardiff University, PhD Thesis, Sep. 2015, pp. 1-205, See pp. 8-13.

Zhang, L. H. et al., "Cu—Zn—(Mn)—(Fe)—Al layered double hydroxides and their mixed metal oxides: physicochemical and catalytic properties in wet hydrogen peroxide oxidation of phenol," Industrial & Engineering Chemistry Research, 2010, vol. 49, No. 13, pp. 5959-5968.

Clarke, Tomos J. et al., "Mechanochemical synthesis of copper manganese oxide for the ambient temperature oxidation of carbon monoxide," Applied Catalysis B: Environmental, Oct. 6, 2014 (e-pub), vol. 165, pp. 222-231, See abstract and pp. 222-224.

Patel, Prasad Prakash et al., "Noble metal-free bifunctional oxygen evolution and oxygen reduction acidic media electrocatalysts," Scientific Reports, Jul. 6, 2016 (e-pub), vol. 6, article No. 28367, internal pp. 1-14, See abstract internal pp. 9-12; figures 1-3; and table 1.

* cited by examiner

HIGHLY ACTIVE, ROBUST AND VERSATILE MULTIFUNCTIONAL, FULLY NON-NOBLE METALS BASED ELECTRO-CATALYST COMPOSITIONS AND METHODS OF MAKING FOR ENERGY CONVERSION AND STORAGE

CROSS-REFERENCE TO RELATED APPLICATION

This application is a U.S. National Stage Application under 35 U.S.C. 071 of International Application No. PCT/2016/066098, filed on Dec. 12, 2016, which claims priority under 35 U.S.C. § 119(e) from U.S. provisional patent application No. 62/265,503, filed on Dec. 10, 2015, both of which are entitled "HIGHLY ACTIVE, ROBUST AND VERSATILE MULTIFUNCTIONAL, FULLY NON-NOBLE METALS BASED ELECTRO-CATALYST COMPOSITIONS AND METHODS OF MAKING FOR ENERGY CONVERSION AND STORAGE," filed on Dec. 10, 2015, the contents of which are incorporated herein by reference.

1. Field of the Invention

This invention relates to non-precious, non-noble metal-based electro-catalyst compositions for use in an acidic media, e.g., acidic electrolyte conditions, methods of preparing these electro-catalyst compositions and, forming composites and electrodes therefrom. More particularly, the electro-catalyst compositions exclude the presence of any noble precious metals and are useful for proton exchange membrane-based water electrolysis, proton exchange membrane fuel cells, direct methanol fuel cells and metal-air batteries.

2. Background

The performance and efficiency of energy generation and storage technologies are dependent on the nature of the electro-catalyst. In general, high performance electro-catalysts are utilized in fuel cells, hydrogen generation from solar (i.e., photocatalytic and photoelectrochemical) and electrolytic water splitting and metal air batteries. Noble metals-based electro-catalysts are known in the art to exhibit excellent electrochemical performance, such as, low over-potential and superior reaction kinetics, as well as long-term stability, in acidic media, e.g., acidic electrolyte, for oxygen reduction reaction (ORR) in proton exchange membrane (PEM) fuel cells and direct methanol fuel cells (DMFCs), oxygen evolution reaction (OER) in PEM-based water electrolysis and metal air batteries, and hydrogen generation from solar energy and electricity driven water splitting.

PEM based fuel cells (PEMFCs, DMFCs) and PEM based water electrolyzers have several advantages over alkaline/neutral based systems. The advantages include higher energy efficiency, superior production rates, increased product purity and more compact design. During PEM fuel cell operation, ORR ensues at the cathode and hydrogen oxidation occurs at the anode of the fuel cell. In summary, water and electrical current is produced. In a PEM-based water electrolyzer, the current flow and the electrodes are reversed and water decomposition takes place. Oxygen evolution occurs at the anode (abbreviated "OER", i.e., oxygen evolution reaction) and reduction of protons ($H^+$), which travel through the membrane, takes place at the cathode. As a result, water is decomposed into hydrogen and oxygen by means of current. The high capital costs of current electrolyzers is due to one or more of the following: deployment of expensive noble metal-based electro-catalysts (e.g., $IrO_2$, $RuO_2$, Pt and the like), use of relatively small and comparatively low efficiency systems, customized power electronics, and labor intensive fabrication. Similarly, the use of expensive and precious noble metals-based electro-catalysts (e.g. Pt, Pd) contributes to the high capital cost of PEM based fuel cells (PEMFCs, DMFCs).

Rutile-type noble metal oxides, such as $IrO_2$ and $RuO_2$, are well known anode electro-catalysts for OER in alkaline and PEM-based water electrolysis. However, the anodic over-potential and the cell resistance in electrolysis contribute to a majority of the losses observed in electro-catalytic performance. In addition, $IrO_2$ and $RuO_2$ electro-catalysts undergo electrochemical or mechanical degradation under extreme and highly corrosive electrochemical environments prevalent in acid-assisted water electrolysis which reduces the performance with time and diminishes the service life of the electrode during OER.

The development of PEM-based systems has been slowed by the use and availability of only expensive noble metal-based electro-catalysts, such as Pt, $IrO_2$ and the like. Thus, there are advantages to reducing the amount, or even precluding the presence of noble metal in electro-catalysts. Likewise, there are concerns that such reduction or preclusion of noble metal will result in low or poor electrochemical performance. These concerns are particularly relevant for electro-catalysts that are employed in harsh acidic conditions, such as, an acidic electrolyte, which is associated with PEM-based systems.

The amount of noble metal present in an electro-catalyst can be reduced by combining the noble metal with a non-noble metal component. For example, it has been known to reduce the amount of the noble metal component by mixing transition metals and/or transition metal compounds, such as, oxides, with noble metals including Pt for ORR and noble metal oxides, such as, $IrO_2$ and/or $RuO_2$ for OER. Further, it is known that combining a higher percentage of non-noble metals and a lower percentage of noble metals can contribute to producing an electro-catalyst exhibiting favorable properties. However, even though the cost of such electro-catalysts is less than a pure noble metal-based electro-catalyst, they are still expensive and can be cost prohibitive in certain applications.

Alternatively, the noble metal present in an electro-catalyst can be completely replaced by a non-noble metal component. Several non-noble metal-based electro-catalysts have been identified for use in alkaline- and neutral-based water electrolysis and fuel cells. For example, Mn-oxide (e.g., $MnO_2$ and $Mn_3O_4$), spinel (e.g., $NiCo_2O_4$) and La-based oxide electro-catalysts (e.g., $LaNiO_3$ and $LaCoO_3$) have been used in alkaline/neutral fuel cells and water electrolysis. However, there are several disadvantages associated with these materials. In particular, it has been difficult to design and develop non-noble metal-based electro-catalysts that exhibit at least comparable performance and preferably, superior performance, and stability as compared to noble metal- and noble metal oxide-based electro-catalysts. Further, $MnO_x$ was found to exhibit poor stability in acidic media, as well as low electronic conductivity, which was not favorable for fast charge transfer during electro-catalytic process. Thus, $MnO_x$-based electro-catalysts were not considered suitable for use in PEM fuel cells.

Thus, there is a desire and need in the art to design and develop electro-catalysts that are composed of non-noble metals in the absence of any precious, noble metals and, capable of exhibiting one or more of superior electronic conductivity, excellent charge transfer kinetics, high electrochemical active surface area, outstanding electrochemical activity for OER and ORR, superior long-term electrochemical stability and excellent methanol tolerance for use in direct methanol fuel cell cathodes.

SUMMARY OF THE INVENTION

In one aspect, the invention provides a noble metal-free electro-catalyst composition for use in acidic media that includes a non-noble metal selected from the group consisting of manganese oxide, copper oxide, zinc oxide, scandium oxide, cobalt oxide, iron oxide, tantalum oxide, tin oxide, niobium oxide, tungsten oxide, titanium oxide, vanadium oxide, chromium oxide, nickel oxide, molybdenum oxide, yttrium oxide, lanthanum oxide, neodymium oxide, erbium oxide, gadolinium oxide, ytterbium oxide, cerium oxide and mixtures thereof. The noble metal-free electro-catalyst is absent of noble metal.

The noble metal-free electro-catalyst composition can also include a dopant selected from the group consisting of at least one element from Group III, V, VI and VII of the Periodic Table. In certain embodiments, the dopant can be selected from the group consisting of fluorine, chlorine, bromine, iodine, sulfur, selenium, tellurium, nitrogen, phosphorus, arsenic, antimony, bismuth, aluminum, boron and mixtures thereof. The dopant can also be present in an amount from greater than 0 to about 20 weight percent based on the total weight of the composition. In preferred embodiments, the dopant can be present in an amount from about 10 to about 15 weight percent based on the total weight of the composition.

The noble metal-free electro-catalyst composition can have a general formula I:

$$(a_x b_y)O_z:wc \qquad (I)$$

wherein, a is Mn, Cu, Zn, Sc, Fe, Co, Ti, V, Ni, Cr, Ta, Sn, Nb, W, Mo, Y, La, Ce, Nd, Er, Gd, Yb or mixtures thereof b is Mn; O is oxygen; c is F, Cl, Br, I, S, Se, Te, N, P, As, Sb, Bi, Al, B or mixtures thereof; x and y are each a number greater than or equal to 0 and less than or equal to 2, x and y may be the same or different, when x=0, y is a number greater than 0 and less than or equal to 2 and when y=0, x is a number greater than 0 and less than or equal to 2; z is a number that is greater than 0 and less than or equal to 4 (for all x and y), and w is from 0% by weight to about 20% by weight, based on the total weight of the composition.

In certain embodiments, the noble metal-free electro-catalyst composition can include manganese and copper oxide, and have a formula of $Cu_{1.5}Mn_{1.5}O_4$. The dopant can be fluorine, which can be present in an amount of 0, 5, 10 or 15 percent by weight of the total composition, such that the formula is $Cu_{1.5}Mn_{1.5}O_4$, $Cu_{1.5}Mn_{1.5}O_4$:5F, $Cu_{1.5}Mn_{1.5}O_4$:10F, or $Cu_{1.5}Mn_{1.5}O_4$:15F, respectively. In other embodiments, the electro-catalyst composition can include manganese and copper oxide, and have a formula of $Cu_{1.5}Mn_{1.5}O_{2.75}$:1.25F.

The form of the non-noble metal-based electro-catalyst composition can include, but is not limited to, nano-particles, a nanocrystalline thin film, nanorods, nanoshells, nanoflakes, nanotubes, nanoplates, nanospheres, nanowhiskers and combinations thereof.

The noble metal-free electro-catalyst composition can also be at least partially coated on a current collector substrate.

The acidic media can be selected from oxygen reduction reaction in a proton exchange membrane fuel cell and oxygen evolution reaction in a proton exchange membrane based water electrolysis.

In another aspect, the invention provides a method for preparing a noble metal-free electro-catalyst composition for an acidic electrolyte. The method includes combining a non-noble metal oxide precursor with a precipitation agent or reaction agent to form a non-noble metal oxide precipitate, separating the precipitate, drying the precipitate, and forming a noble metal-free oxide powder.

The method can further include introducing a dopant precursor prior to the step of drying the precipitate, to form a solid solution.

The non-noble metal oxide precursor can be a salt, such as manganese acetate tetrahydrate, the precipitation agent or reaction agent can be potassium permanganate, the precipitate can be manganese dioxide nanoparticles, the dopant precursor can be a fluorine-containing salt, such as ammonium fluoride, and the powder can be fluorine-doped manganese oxide powder.

In still another aspect, the invention provides a method for preparing a noble metal-free electro-catalyst composition for an electrode. The method includes preparing a non-noble metal oxide nanomaterial, adding a halogen precursor, forming a precipitate, dispersing the precipitate in solvent to form a sol gel, and drying the sol gel to form a non-noble metal oxide powder.

BRIEF DESCRIPTION OF THE DRAWINGS

A further understanding of the invention can be gained from the following description of the preferred embodiments when read in conjunction with the accompanying drawings in which.

DETAILED DESCRIPTION OF THE PREFERRED EMBODIMENTS

Figure 1A:
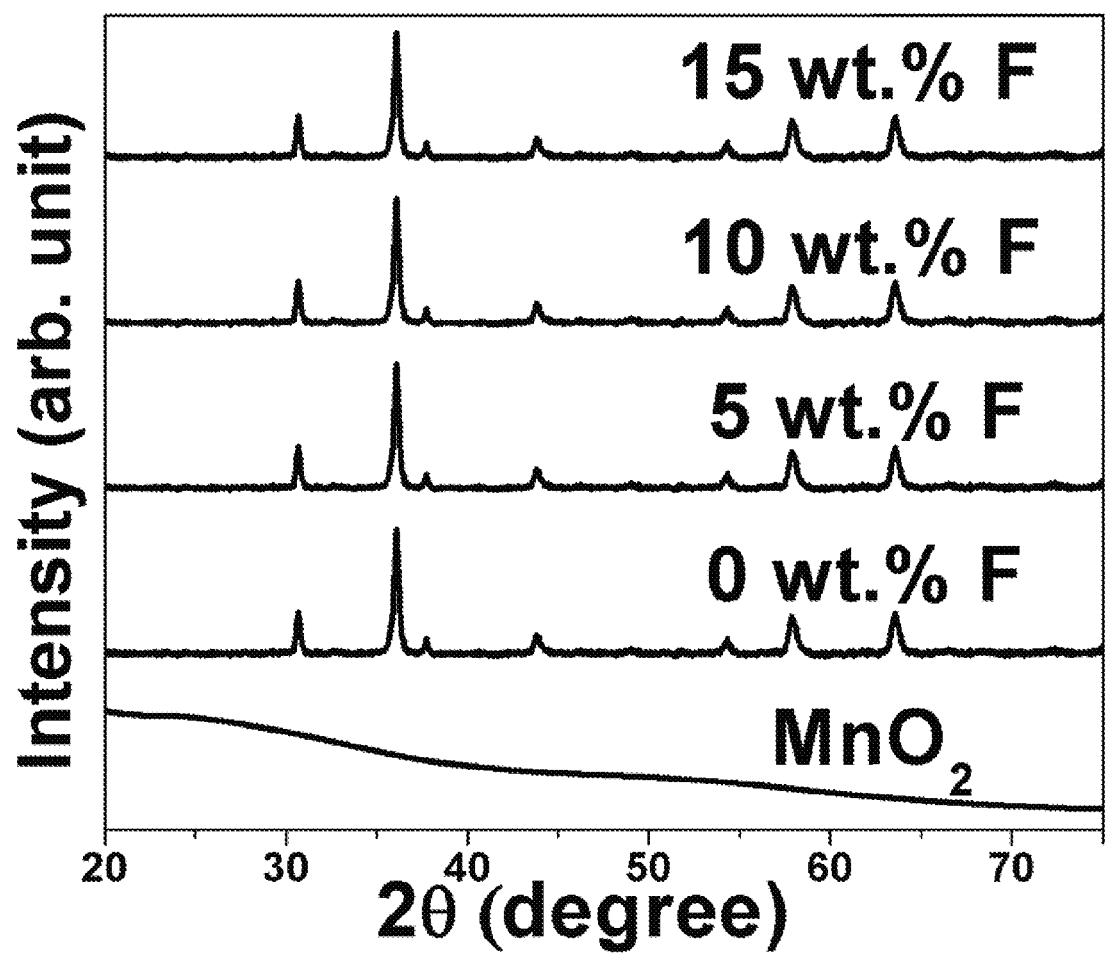
FIG. 1a is a plot that shows the XRD patterns of amorphous $MnO_2$ and $Cu_{1.5}Mn_{1.5}O_4$:F of varying fluorine contents.

The invention relates to non-precious, non-noble metal-based electro-catalyst compositions absent of noble metal for use in acidic media, e.g., acidic electrolyte conditions. The invention provides low cost, highly active, durable, electro-catalysts completely free or absent of precious, noble metals for oxygen reduction reaction (ORR) in proton exchange membrane (PEM) fuel cells and direct methanol fuel cells, and oxygen evolution reaction (OER) in PEM based water electrolysis and metal air batteries.

In order to achieve high electrochemical performance, it is typical for an electro-catalyst to be composed of noble metal. However, due to the high cost associated with the high performance noble and precious metals, it is advantageous to reduce the amount of noble metal in the electro-catalyst compositions. It is even more advantageous to preclude the use of noble metal completely. Although, a disadvantage of the use of an electro-catalyst that is devoid of noble metal is the expectedly reduced, or even poor, electrochemical performance. Thus, as previously described, there have been found in the prior art various combinations of noble metal and non-noble metal electro-catalyst compositions. Further, there has also been found non-noble metal electro-catalyst compositions for use in alkaline or neutral media. It has proven difficult to date thus far, however, to prepare a completely non-noble metal based electro-catalyst for acidic media, e.g., acidic electrolyte that performs comparable to noble metal electro-catalyst compositions. The present invention provides completely non-noble metal-based electro-catalyst compositions absent of noble metal for use in acidic media that demonstrate one or more of superior electro-catalytic activity, excellent electrochemical stability and moreover, low over-potential that is typically exhibited by noble metal electro-catalyst compositions.

The electro-catalyst compositions according to the invention are suitable for use in a variety of applications that employ harsh acidic conditions, such as, an acidic electrolyte, for ORR in PEM fuel cells and direct methanol fuel cells, and OER in PEM-based water electrolysis and metal-air batteries.

The electro-catalyst compositions of the present invention include one or more non-noble metals. Suitable non-noble metals for use in this invention include a wide variety that are known in the art, such as, non-noble metal oxides, such as, but not limited to, manganese oxide, copper oxide, zinc oxide, scandium oxide, cobalt oxide, iron oxide, titanium oxide, nickel oxide, chromium oxide, vanadium oxide, tantalum oxide, tin oxide, niobium oxide, tungsten oxide, molybdenum oxide, yttrium oxide, lanthanum oxide, neodymium oxide, erbium oxide, gadolinium oxide, ytterbium oxide, cerium oxide and, combinations and mixtures thereof.

The form of the non-noble metal oxide can include any configuration of a solid or hollow nano-material. Non-limiting examples of suitable nano-materials include myriad configurations and geometries of nanoscale architectures, such as, but not limited to, nano-particles, a nanocrystalline thin film, nanorods, nanoshells, nanoflakes, nanotubes, nanoplates, nanospheres, nanowhiskers and combinations thereof, of myriad nanoscale architecture embodiments.

It is an object of the invention for the non-noble metal-based electro-catalyst to preclude the use of the noble metal loading that is typically required, without decreasing the electrochemical activity as compared to pure noble metal electro-catalysts that are known in the art. The non-noble metal-based electro-catalyst compositions also demonstrate equivalent or improved corrosion stability in oxygen reduction reaction (ORR) and oxygen evolution reaction (OER) processes, as compared to known pure noble metal electro-catalysts. The non-noble metal-based electro-catalyst compositions can be at least partially deposited or coated on a support or substrate. Suitable supports or substrates include a wide variety that are known in the art for use as an electrode, such as, a current collector, such as, but not limited to, titanium (Ti) foil, glassy carbon (GC) disk.

The electro-catalyst compositions can also include a dopant to the non-noble metal component. The dopant can be selected from various elements known in the art which can enhance electronic conductivity and stability of the composition. The dopant can be an electron donor element. Suitable dopants include the elements in Groups III, V, VI and VII of the Periodic Table, and mixtures thereof. In certain embodiments, the non-noble metal component is doped with fluorine, chlorine, bromine, iodine, sulfur, selenium, tellurium, nitrogen, phosphorus, arsenic, antimony, aluminum, bismuth, boron and mixtures thereof. Without intending to be bound by any particular theory, it is believed that doping increases the electronic conductivity and therefore, provides improved stability to an electro-catalyst support.

The amount of the dopant can vary and in certain embodiments, can be present in an amount from greater than 0 to about 20% by weight based on the total weight of the composition. In other embodiments, the dopant can constitute from about 10% to about 15% by weight based on the total weight of the composition. In preferred embodiments, about 10% by weight of fluorine is present as the dopant, based on the total weight of the composition.

The electro-catalyst composition can have a general formula I:

$$(a_x b_y)O_z\!:\!wc \qquad (I)$$

wherein, a is Mn, Cu, Zn, Sc, Fe, Co, Ti, V, Ni, Cr, Ta, Sn, Nb, W, Mo, Y, La, Ce, Nd, Er, Gd, Yb or mixtures thereof; b is Mn; O is oxygen; c is F, Cl, Br, I, S, Se, Te, N, P, As, Sb, Bi, Al, B or mixtures thereof; x and y are each a number greater than or equal to 0 and less than or equal to 2, x and y may be the same or different; when x=0, y is a number greater than 0 and less than or equal to 2 and when y=0, x is a number greater than 0 and less than or equal to 2; z is a number that is greater than 0 and less than or equal to 4 (for all x and y), and w is from 0% by weight to about 20% by weight, based on the total weight of the composition.

In certain embodiments, the electro-catalyst compositions include the following formulas for undoped and doped electro-catalysts of 5%, 10% and 15% by weight, respectively: $Cu_{1.5}Mn_{1.5}O_4$, $Cu_{1.5}Mn_{1.5}O_4$:5F, $Cu_{1.5}Mn_{1.5}O_4$:10F and $Cu_{1.5}Mn_{1.5}O_4$:15F. In another embodiment, the electro-catalyst formula is $Cu_{1.5}Mn_{1.5}O_{2.75}$:1.25F.

In certain embodiments of the invention, the electro-catalyst compositions include binary oxide compositions, wherein the non-noble metal component includes two non-noble metal oxides, such as, but not limited to, copper oxide and manganese oxide. Alternatively, the electro-catalyst compositions can include ternary oxide compositions, wherein the non-noble metal component includes three non-noble metal oxides.

The non-noble metal-based electro-catalysts of the invention can be prepared using conventional methods and apparatus known in the art. For example, a scalable wet chemical approach can be employed to synthesize nanostructured electro-catalyst compositions in accordance with the invention. This approach can produce electro-catalysts with high specific surface area for use in unsupported and supported forms utilizing carbon, undoped and doped carbon nanotubes (CNTs) with elements such as F, Cl, Br, I, S, Se, Te, N, P, As, Sb, Bi, Al, B and mixtures thereof, graphene and reduced graphene oxide, and mixtures thereof, to form a composite and an electrode.

In general, a solid solution of non-noble metal oxide nanoparticles is formed, dried and then, heat treated, to form a powder. For example, a non-noble metal oxide precursor, e.g., a salt, such as but not limited to manganese acetate tetrahydrate, is combined with a precipitation agent or reaction agent, such as but not limited to, potassium permanganate, to form non-noble metal oxide nanoparticles, such as but not limited to, manganese dioxide nanoparticles. A dopant is introduced by adding a dopant precursor, such as but not limited to, ammonium fluoride, to form a solid solution. The solid solution is dried and heat treated to result in a doped non-noble metal oxide powder, such as but not limited to, fluorine-doped manganese oxide powder.

The non-noble metal-based electro-catalysts prepared according to the invention demonstrate one or more of the following advantages:

Multifunctional non-noble metal based electro-catalyst compositions ($a_x b_y$)$O_z$: w wt. % c (a=Mn, Cu, Zn, Sc, Fe, Co, Ti, V, Ni, Cr, Ta, Sn, Nb, W, Mo, Y, La, Ce, Nd, Er, Gd, Yb and mixtures thereof; b=Mn, O=oxygen; c=F, Cl, Br, I, S, Se, Te, N, P, As, Sb, Bi, Al, B and mixtures thereof; $0 \leq x \leq 2$, $0 \leq y \leq 2$; when x=0, $0 < y \leq 2$, when y=0, $0 < x \leq 2$, $0 < z \leq 4$ for all x and y; and w=0-20 wt. %) with unique modified electronic structure resulting in electro-catalytically active phase for OER in PEM based water electrolysis and ORR in PEMFCs and DMFCs.

Nanostructured electro-catalyst compositions with high specific surface area (>~109 $m^2/g$) synthesized using simple and easily scalable wet chemical synthesis approach.

High electrical conductivity of electro-catalyst compositions resulting in superior charge transfer kinetics, almost similar or superior to that of the noble metal electro-catalysts.

Excellent onset potential of electro-catalyst compositions for OER and ORR, similar to that of state of the art noble metal electro-catalysts (Pt, $IrO_2$).

Remarkable electro-catalytic activity (excellent reaction kinetics) of electro-catalyst compositions for OER and ORR, comparable to that of state of the art noble metal electro-catalysts (Pt, $IrO_2$).

Excellent methanol tolerance of electro-catalyst compositions, significantly superior than that of state of the art noble metal electro-catalysts (Pt), making electro-catalyst compositions suitable for use in DMFC cathodes.

Excellent long term electrochemical stability and superior cycling characteristics of electro-catalyst compositions under harsh acidic operating conditions of OER and ORR, similar to that of state of the art noble metal electro-catalysts (Pt, $IrO_2$).

Outstanding electro-catalytic performance and unprecedented long term stability for OER and ORR for non-noble metals based electro-catalyst in acidic media.

The excellent electro-catalytic activity and superior long term stability of electro-catalyst compositions make the electro-catalyst compositions suitable for use in energy generation and storage technologies such as metal-air batteries. Thus, the electro-catalysts of the invention can be used as a catalyst in metal-air batteries, and hydrogen generation from solar energy and electricity-driven water splitting.

EXAMPLES

Copper manganese oxide based electro-catalyst systems for ORR in PEM based fuel cells (PEMFCs, DMFCs) and OER in water electrolysis were prepared on the grounds of economic and highly efficient operation in acidic media compared to neutral and basic media. The first-principles calculations of the total energies and electronic structures were carried out to identify suitable Cu—Mn—O based electro-catalyst systems. Based on theoretical calculations, $Cu_{1.5}Mn_{1.5}O_4$ and x wt. % F doped $Cu_{1.5}Mn_{1.5}O_4$ (x=0, 5, 10, 15) were explored as highly active and durable electro-catalysts, expected to possess unique electronic structure resulting in adsorption and desorption of reaction intermediates similar to that of Pt for ORR and $IrO_2$ for OER. Fluorine (F) was used as dopant for $Cu_{1.5}Mn_{1.5}O_4$ to improve electronic conductivity of $Cu_{1.5}Mn_{1.5}O_4$, on the grounds of ubiquitous use of F in transparent conductive oxides for solar cells, heat mirrors, and the like, as well as the role of F in improving electrochemical activity of (Ir,Sn,Nb)$O_2$ systems. The synthesis of F-doped $Cu_{1.5}Mn_{1.5}O_4$ provides an opportunity for tailoring electronic structure, physical, electronic and electro-catalytic properties of $MnO_x$. Thus, this example provides the physical characterization and electrochemical performance of nanostructured $Cu_{1.5}Mn_{1.5}O_4$:x wt. % F (x=0, 5, 10, 15) electro-catalysts for OER in PEM water electrolysis and ORR in PEMFCs and DMFCs.

For a computational study, a qualitative evaluation of the electrochemical activity of electro-catalysts was conducted. There was shown the existence of a simple descriptor for determining the surface catalytic activity of the electro-catalysts. This descriptor was defined as a gravity center of the transition metal d-band Ed usually located in the vicinity of the Fermi level. An optimal position of the d-band center provides an optimal interaction between the catalytic surface and various species participating in the catalytic reactions predominantly occurring on the surface leading to the expected maximum catalytic activity. Thus, such an optimal interaction allows the reactants and products to both adsorb at the surface and desorb most efficiently. Hence, an adjustment of the d-band center position with respect to the Fermi level is likely critical in designing novel highly active electro-catalysts discussed herein.

The projected d-band densities of electronic states together with corresponding centers of these zones were obtained for pure Pt, $IrO_2$, $Cu_{1.5}Mn_{1.5}O_4$, and $Cu_{1.5}Mn_{1.5}O_{2.75}F_{1.25}$ (containing ~9.7 wt. % of F). The d-band positions of state of the art electro-catalysts Pt and $IrO_2$ served as a benchmark for the optimal catalytic activity of the designed electro-catalysts. Calculations showed the same d-band center positions relative to the Fermi level of both Pt and $IrO_2$— at ~(−1.33 eV) suggesting similar interaction between the catalytic surface and various intermediate species in both ORR and OER, because these reactions involve virtually the same intermediate species, but in the opposite directions. Thus, the closer the corresponding d-band center of the electro-catalyst to d-band center position of Pt or $IrO_2$, the better the overall catalytic activity of the electro-catalyst. Thus, the equivalence of the electronic structure of the F-doped copper manganese oxide electro-catalyst composition with the Pt and $IrO_2$ electro-catalysts, was demonstrated.

The calculated projected 3d-electronic density of states of Cu and Mn elements in $Cu_{1.5}Mn_{1.5}O_4$ showed the d-band center located at −1.05 eV vs Fermi level, which was slightly above Pt or $IrO_2$ benchmark line, however very near to it, indicating relatively high catalytic activity of $Cu_{1.5}Mn_{1.5}O_4$. An introduction of F into $Cu_{1.5}Mn_{1.5}O_4$ modified an overall electronic structure such that formation of hybridized F2p-Mn3d electronic states below −7 eV shifted the d-band center downward to −1.45 eV, which was slightly below that of Pt or $IrO_2$ (−1.33 eV). Assuming linear shift of the d-band center during increase of F-content, the most optimal F-content bringing the overall d-band center of F-doped $Cu_{1.5}Mn_{1.5}O_4$ right to the Pt or $IrO_2$ benchmark position should be approximately 8-10 wt. % of F, which is similar to experimentally determined optimal F content of 10 wt. % (discussed later). Thus, F-doping in $Cu_{1.5}Mn_{1.5}O_4$ resulted in the modification of the electronic structure in general and shift of the d-band center position to Pt or $IrO_2$ in particular, thereby improving the overall catalytic activity of $Cu_{1.5}Mn_{1.5}O_4$.

The XRD patterns of chemically synthesized $Cu_{1.5}Mn_{1.5}O_4$ and $Cu_{1.5}Mn_{1.5}O_4$:F of different F content, shown in FIG. 1a, shows the single phase cubic structure with peaks corresponding to $Cu_{1.5}Mn_{1.5}O_4$ (JCPDS card no: 70-0260) without any peaks of secondary phase, suggesting incorporation of F in lattice of $Cu_{1.5}Mn_{1.5}O_4$. The lattice parameters of $Cu_{1.5}Mn_{1.5}O_4$ and $Cu_{1.5}Mn_{1.5}O_4$:F of all compositions is a~0.827 nm and molar volume of 85.16 $cm^3$/mol, which is consistent with the reported literature value and suggests no significant effect of F doping on molar volume of $Cu_{1.5}Mn_{1.5}O_4$:F. This can be potentially due to comparable ionic radius of $O^{-2}$ (125 pm) and $F^{-1}$ (120 pm).

The effective crystallite size of $Cu_{1.5}Mn_{1.5}O_4$ and $Cu_{1.5}Mn_{1.5}O_4$:F of different F content, (calculated using the Scherrer formula) was 8-10 nm indicating nano-crystalline nature of $Cu_{1.5}Mn_{1.5}O_4$:F with minimal effect of F doping on crystallite size of $Cu_{1.5}Mn_{1.5}O_4$. The measured BET surface area of $Cu_{1.5}Mn_{1.5}O_4$ and $Cu_{1.5}Mn_{1.5}O_4$:F was 109 $m^2$/g, which can be due to minimal effect of F-doping on particle size of all compositions as discussed (see Table 1).

TABLE 1

Results of electrochemical characterization for OER.

| Electro-catalyst | BET surface area ($m^2$/g) | Onset potential for OER (V vs RHE) | Current density for OER at 1.55 V (vs RHE) (mA/$cm^2$) | $R_s$ ($\Omega \cdot cm^2$) | $R_e$ ($\Omega \cdot cm^2$) | $R_{ct}$ ($\Omega \cdot cm^2$) | Tafel slope (mV/dec) |
|---|---|---|---|---|---|---|---|
| $Cu_{1.5}Mn_{1.5}O_4$ | 109 | 1.43 | 6.36 | 16.38 | 5 | 44.9 | 66.8 |
| $Cu_{1.5}Mn_{1.5}O_4$:5F | 109 | 1.43 | 7.32 | 16.31 | 4.71 | 29.2 | 65.7 |
| $Cu_{1.5}Mn_{1.5}O_4$:10F | 109 | 1.43 | 9.15 | 16.35 | 3.5 | 15.15 | 60 |
| $Cu_{1.5}Mn_{1.5}O_4$:15F | 109 | 1.43 | 5.63 | 16.36 | 4.95 | 47.2 | 69.1 |
| $IrO_2$ | 191 | 1.43 | 7.74 | 16.35 | 3.65 | 17.9 | — |

Figure 1B:
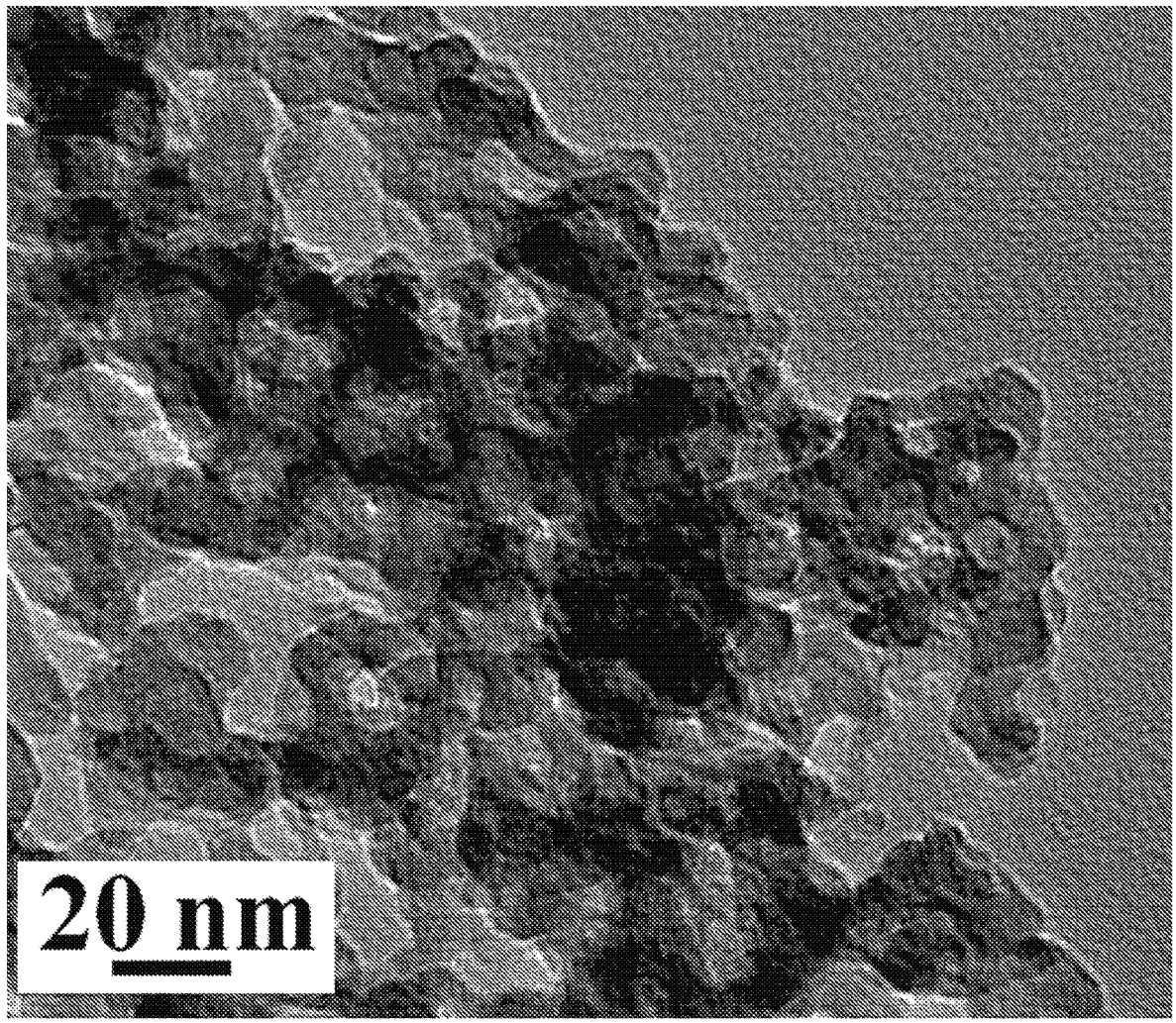
FIG. 1b is a TEM image of $Cu_{1.5}Mn_{1.5}O_4$:10F indicating the uniform (~8-10 nm) nanosized range of the catalyst particles generated.
Figure 1C:
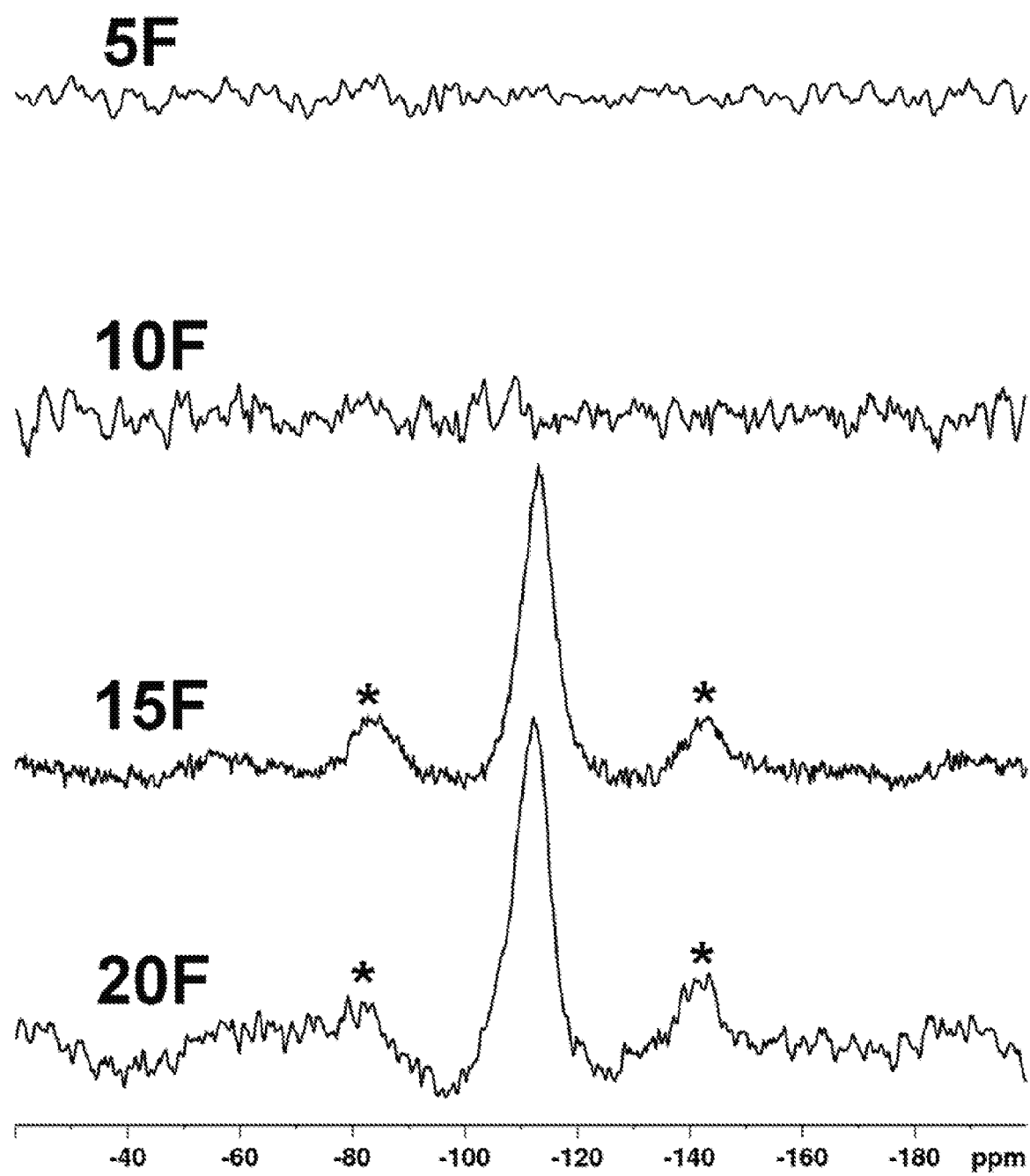
FIG. 1c shows the $^{19}F$ MAS NMR spectra of $Cu_{1.5}Mn_{1.5}O_4$:5F, $Cu_{1.5}Mn_{1.5}O_4$:10F, $Cu_{1.5}Mn_{1.5}O_4$:15F and $Cu_{1.5}Mn_{1.5}O_4$:20F indicating the presence of fluorine (spinning side bands are marked by asterisks)

The SEM image along with the EDX pattern of $Cu_{1.5}Mn_{1.5}O_4$:10F showed the presence of Cu, Mn and O. The quantitative elemental composition analysis of $Cu_{1.5}Mn_{1.5}O_4$:10F obtained by EDX confirmed that the measured elemental composition of Cu and Mn was close to the nominal composition. The elemental x-ray maps of Cu, Mn and O of $Cu_{1.5}Mn_{1.5}O_4$:10F showed homogeneous distribution of Cu, Mn and O within the particles without segregation at any specific site. The bright field TEM image of a representative composition $Cu_{1.5}Mn_{1.5}O_4$:10F (FIG. 1b), showed nanometer sized particles in the size range 8-10 nm which was consistent with the XRD analysis. The HRTEM image of $Cu_{1.5}Mn_{1.5}O_4$:10F showed lattice fringes with a spacing of ~0.249 nm which corresponded with the (113) inter-planer spacing of cubic $Cu_{1.5}Mn_{1.5}O_4$:10F determined from XRD analysis. The elemental oxidation state was studied by conducting x-ray photoelectron spectroscopy (XPS) on the electro-catalysts. The XPS spectrum of Cu of $Cu_{1.5}Mn_{1.5}O_4$:0F showed a broad peak between ~940 eV-945 eV corresponding to Cu' satellites and peaks centered at 931 eV and 934 eV suggesting the presence of monovalent ($Cu^+$) and divalent copper ($Cu^{2+}$), respectively. The XPS spectrum of Mn indicated presence of both Mn' and $Mn^{4+}$. The presence of F could not be ascertained by XPS analysis. However, a positive shift of ~0.4 eV in Cu $2p_{3/2}$ and Mn $2p_{3/2}$ peaks of $Cu_{1.5}Mn_{1.5}O_4$:10F was seen compared to that of $Cu_{1.5}Mn_{1.5}O_4$, indicating stronger binding potentially due to higher electro-negativity of fluorine incorporated into the lattice. The presence of F was confirmed using NMR spectroscopy. FIG. 1c shows dramatic loss of $^{19}$F NMR signal for $Cu_{1.5}Mn_{1.5}O_4$:5F and $Cu_{1.5}Mn_{1.5}O_4$:10F presumably due to large $^{19}$F-electron hyperfine interactions due to the unpaired electrons from the paramagnetic Cu and Mn centers, indicating position of F atoms close to Mn/Cu in the lattice. FIG. 1c shows clear $^{19}$F resonances at ~(−110 ppm) for $Cu_{1.5}Mn_{1.5}O_4$:15F and $Cu_{1.5}Mn_{1.5}O_4$:20F samples indicating the diamagnetic nature, and also suggesting the position of F atoms farther away from the metal center. Thus, NMR results not only confirmed presence of F in $Cu_{1.5}Mn_{1.5}O_4$:F but also provided information about its proximity to metal centers.

Figure 2A:
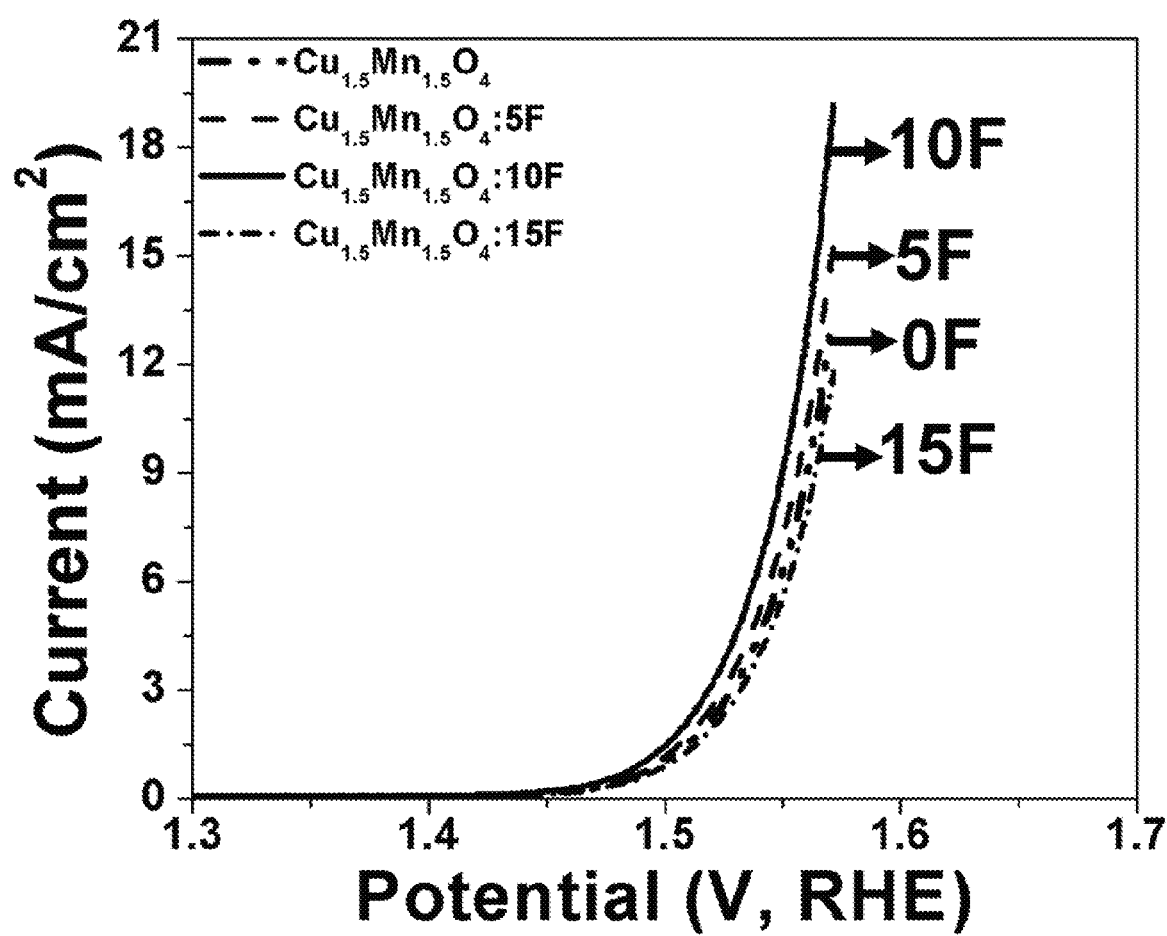
FIGS. 2a and 2b are plots that show the $iR_\Omega$ corrected polarization curves for OER of $Cu_{1.5}Mn_{1.5}O_4$:F of varying fluorine content (total loading of 1 $mg/cm^2$) and $IrO_2$ (total loading of 0.15 $mg/cm^2$) obtained in 0.5 M $H_2SO_4$ solution at 40° C.
Figure 2B:
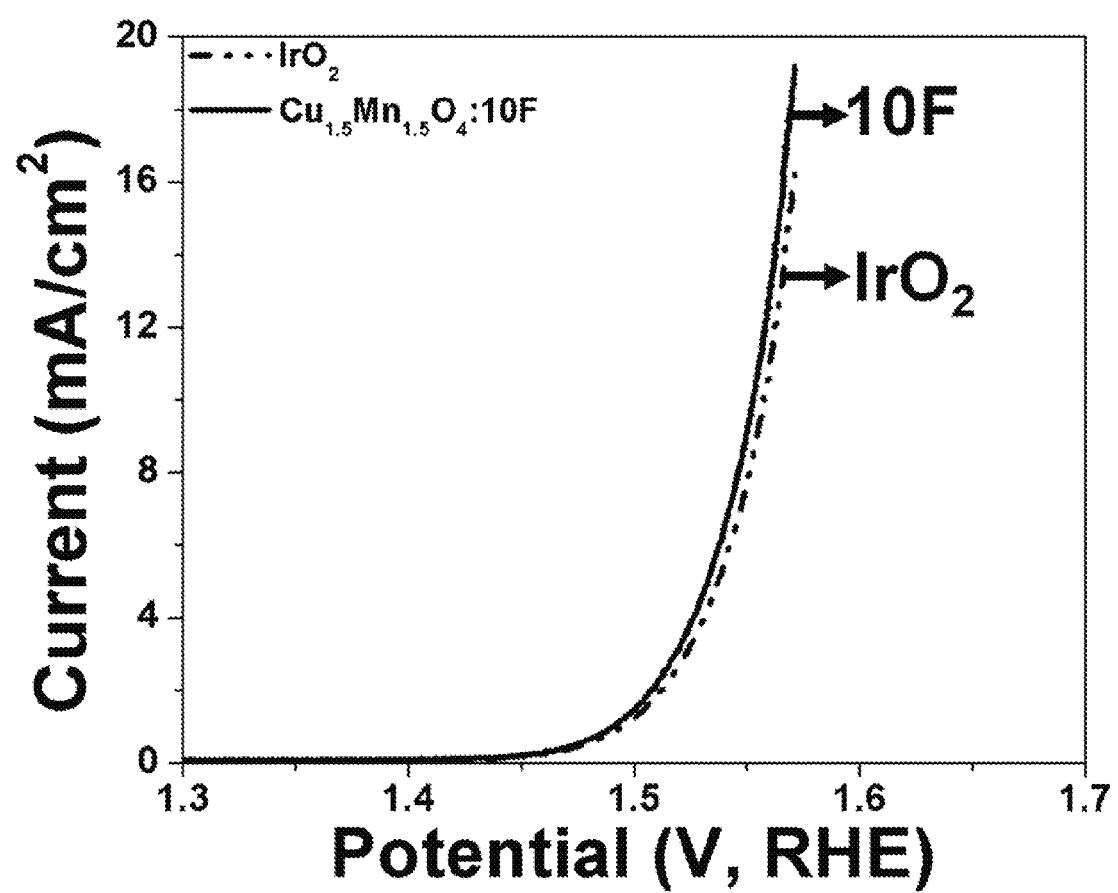

The onset potential of OER for $Cu_{1.5}Mn_{1.5}O_4$ and $Cu_{1.5}Mn_{1.5}O_4$:F of all compositions was ~1.43±0.001 V (vs RHE), which is similar to that of in-house synthesized as well as commercially obtained $IrO_2$ (FIG. 2a-b and Table 1). This suggests similar reaction polarization of $Cu_{1.5}Mn_{1.5}O_4$:F of different F content to that of the in-house synthesized $IrO_2$. $Cu_{1.5}Mn_{1.5}O_4$:F of different F content exhibited the peak potential of reduction of surface oxides of ~0.75±0.001 V (vs RHE) similar to that of Pt/C (FIG. 2d-e). The similar peak potential of reduction of surface oxides of $Cu_{1.5}Mn_{1.5}O_4$:F and Pt/C suggests similar binding strength of oxygen containing species (OH, O, $O_2$) on the surface of each electro-catalyst and thus, similar reaction polarization for ORR of $Cu_{1.5}Mn_{1.5}O_4$:F and Pt/C. These results indicate unique electronic structure of $Cu_{1.5}Mn_{1.5}O_4$:F of different F content offering lower reaction polarization which is similar to that of noble electro-catalysts.

The electrolyte solution resistance ($R_s$), electrode resistance ($R_e$) and bubble resistance ($R_{bub}$) are mainly responsible for linear nature of polarization curve and non-linearity in Tafel plot. Thus, to study the inherent electrochemical activity of electro-catalysts, ohmic resistance ($R_\Omega$) correction ($iR_\Omega = iR_s + iR_e$) was conducted in polarization and cyclic voltammogram (CV) curves. The values of $R_s$ and $R_e$ of the different electro-catalysts were obtained from electrochemical impedance spectroscopy (EIS) measurements (discussed later) and given in Table 1 and Table 2.

TABLE 2

Results of electrochemical characterization for ORR.

| Electro-catalyst | Current density for ORR at 0.9 V (vs RHE) (mA/cm$^2$) | $R_\Omega$ ($\Omega \cdot cm^2$) | $R_{ct}$ ($\Omega \cdot cm^2$) | Tafel slope (mV/dec) in LCR | Tafel slope (mV/dec) in HCR |
|---|---|---|---|---|---|
| $Cu_{1.5}Mn_{1.5}O_4$ | 0.44 | 16.5 | 31.5 | 75 | 130 |
| $Cu_{1.5}Mn_{1.5}O_4$:5F | 0.7 | 16.45 | 28.55 | 72 | 127 |
| $Cu_{1.5}Mn_{1.5}O_4$:10F | 1.15 | 16.4 | 15.6 | 68 | 123 |
| $Cu_{1.5}Mn_{1.5}O_4$:15F | 0.35 | 16.38 | 41.62 | 79 | 141 |
| Pt/C | 1.26 | 16.39 | 9.2 | — | — |

Figure 2C:
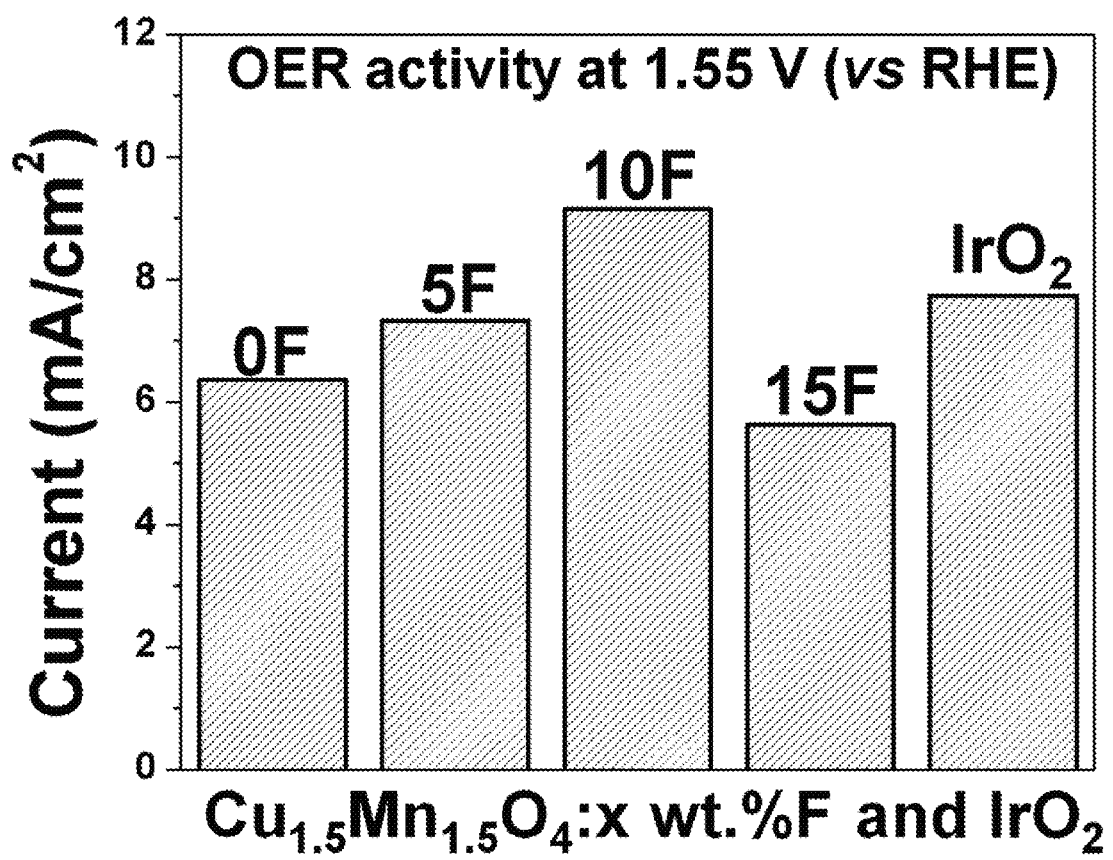
FIG. 2c is a bar graph that shows a comparison of the electrochemical activity for OER of $Cu_{1.5}Mn_{1.5}O_4$:F of varying fluorine content (total loading of 1 $mg/cm^2$) and $IrO_2$ (total loading of 0.15 $mg/cm^2$) at 1.55 V (vs RHE)
Figure 2D:
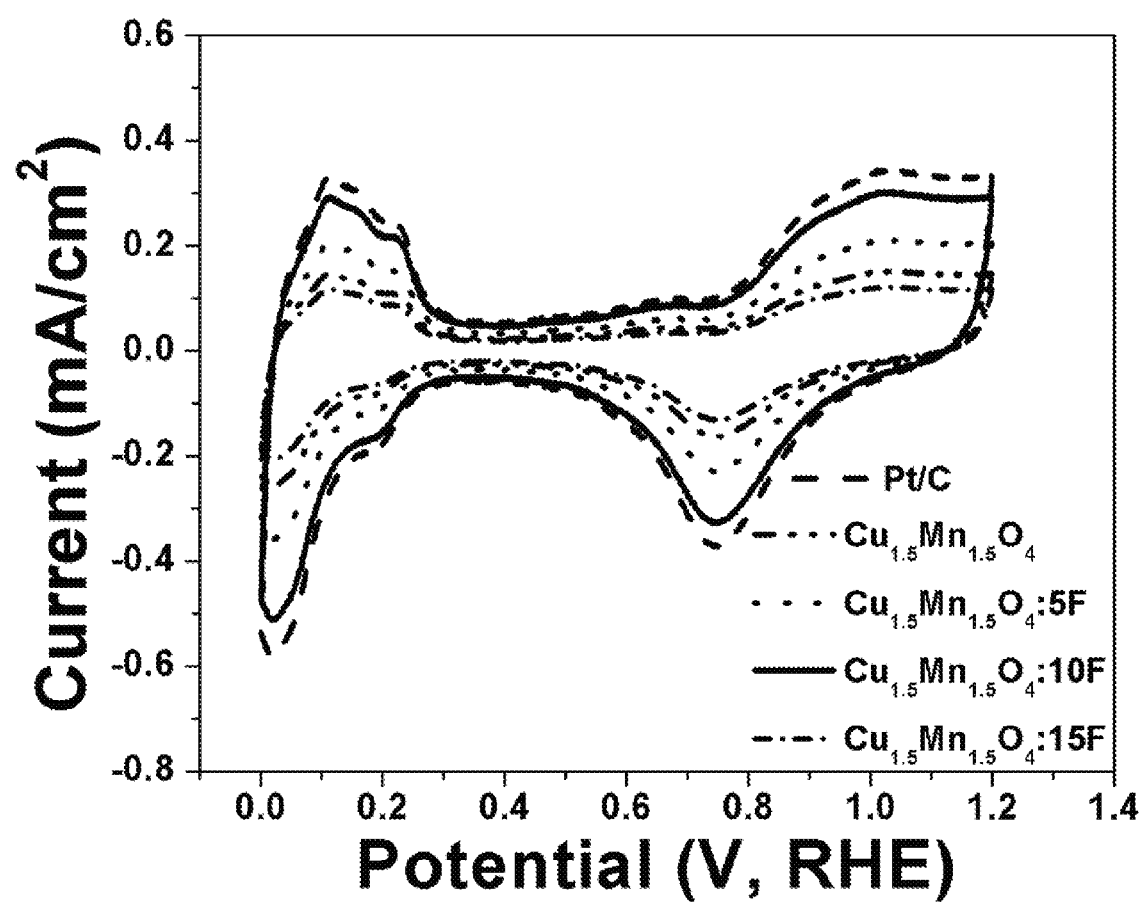
FIG. 2d is a plot that shows the cyclic voltammograms of $Cu_{1.5}Mn_{1.5}O_4$:F of varying fluorine content (total loading of 50 $\mu g/cm^2$) and Pt/C (Pt loading of 30 $\mu g_{Pt}/cm^2$), in $N_2$-saturated 0.5 M $H_2SO_4$ at 26° C.
Figure 2E:
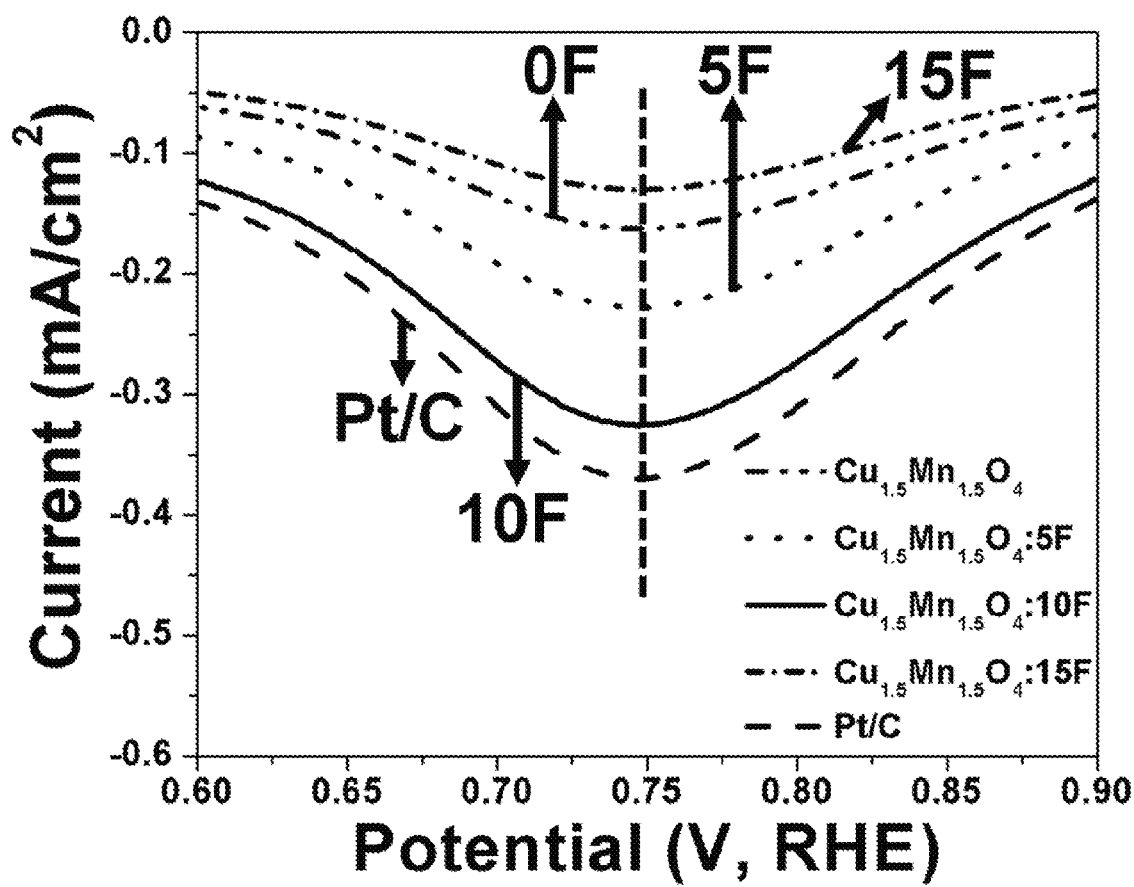
FIG. 2e is a plot (magnified view) that shows the cyclic voltammograms of $Cu_{1.5}Mn_{1.5}O_4$:F of varying fluorine content (total loading of 50 $\mu g/cm^2$) and Pt/C (Pt loading of 30 $\mu g_{Pt}/cm^2$), in $N_2$-saturated 0.5 M $H_2SO_4$ at 26° C.

The current density for in-house synthesized $IrO_2$ electro-catalyst (total loading=0.15 mg/cm$^2$) is ~7.74±0.0001 mA/cm$^2$ at 1.55 V (vs RHE typical potential selected for assessing electrochemical activity for OER) (FIG. 2a-c and Table 1). $Cu_{1.5}Mn_{1.5}O_4$, $Cu_{1.5}Mn_{1.5}O_4$:5F, $Cu_{1.5}Mn_{1.5}O_4$:10F and $Cu_{1.5}Mn_{1.5}O_4$:15F (total loading=1 mg/cm$^2$) showed excellent electro-catalytic activity for OER with current density of ~6.36±0.001 mA/cm$^2$, ~7.32±0.001 mA/cm$^2$, ~9.15±0.0001 mA/cm$^2$ and ~5.63±0.001 mA/cm$^2$ at 1.55 V (vs RHE), respectively (FIG. 2a-c and Table 1). Thus, $Cu_{1.5}Mn_{1.5}O_4$, $Cu_{1.5}Mn_{1.5}O_4$:5F, $Cu_{1.5}Mn_{1.5}O_4$:10F and $Cu_{1.5}Mn_{1.5}O_4$:15F showed remarkable electrochemical activity, i.e., 83%, 95%, 118% and 73% of that of in-house synthesized $IrO_2$ (FIG. 2c). The reaction kinetics of $Cu_{1.5}Mn_{1.5}O_4$:F was studied by conducting EIS to determine $R_s$, $R_e$ and charge transfer resistance ($R_{ct}$). The decrease in electrode resistance ($R_e$) with increase in F content up to 10 wt. % doped in $Cu_{1.5}Mn_{1.5}O_4$ lattice can be due to the improved electronic conductivity of $Cu_{1.5}Mn_{1.5}O_4$:F up to 10 wt. % F followed by decrease in electronic conductivity (increase in $R_e$) for 15 wt. % F content (Table 1). $R_{ct}$ determined from the diameter of semi-circle in high frequency region of EIS plot and Tafel slope (Table 1) decrease with increase in F content with the lowest $R_{ct}$ and Tafel slope obtained for $Cu_{1.5}Mn_{1.5}O_4$:10F (~15.15±0.0001 $\Omega \cdot cm^2$ and ~60±0.0001 mV/dec) suggesting improvement in reaction kinetics (decrease in activation polarization) with increase in F content up to 10 wt. % F. The $R_{ct}$ and Tafel slope increase after continued increase in F content beyond 10 wt. % potentially due to poor reaction kinetics and also decrease in electronic conductivity (due to increase in $R_e$) (Table 1). The Tafel slope of $Cu_{1.5}Mn_{1.5}O_4$:10F (~60±0.0001 mV/dec) indicate two electron pathway for OER (Table 1). It is noteworthy that $R_{ct}$ for $Cu_{1.5}Mn_{1.5}O_4$:10F (~15.15±0.0001 $\Omega \cdot cm^2$) is lower than that of the in-house synthesized $IrO_2$ (~17.9±0.0001 $\Omega \cdot cm^2$) indicating excellent reaction kinetics for $Cu_{1.5}Mn_{1.5}O_4$:10F resulting in comparable electrochemical activity (i.e., current density) to that of $IrO_2$ (FIG. 2a-c and Table 1).

Figure 3A:
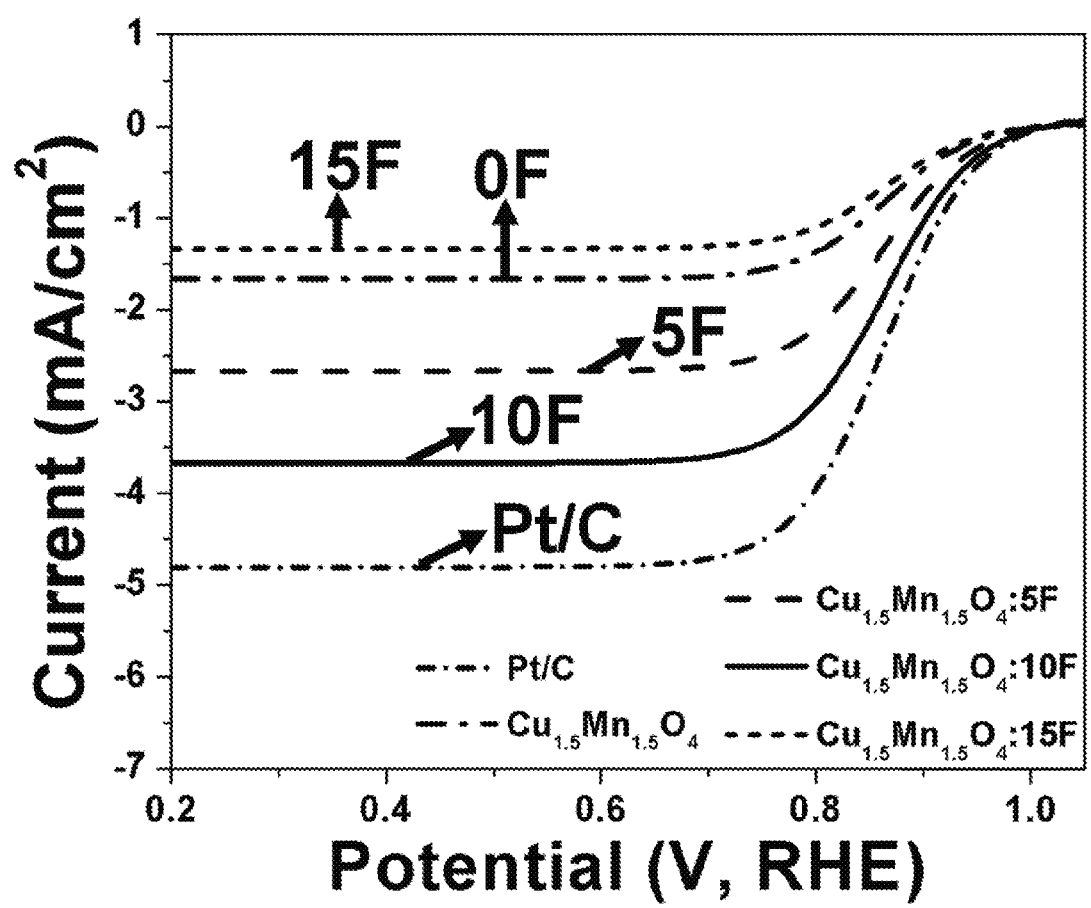
FIG. 3a is a plot that shows the $iR_\Omega$ corrected polarization curves for ORR of $Cu_{1.5}Mn_{1.5}O_4$:F of varying fluorine content (total loading of 50 $\mu g/cm^2$) and Pt/C (Pt loading of 30 $\mu g_{Pt}/cm^2$) in $O_2$-saturated 0.5 M $H_2SO_4$ solution at 26° C. with rotation speed of 2500 rpm.
Figure 3B:
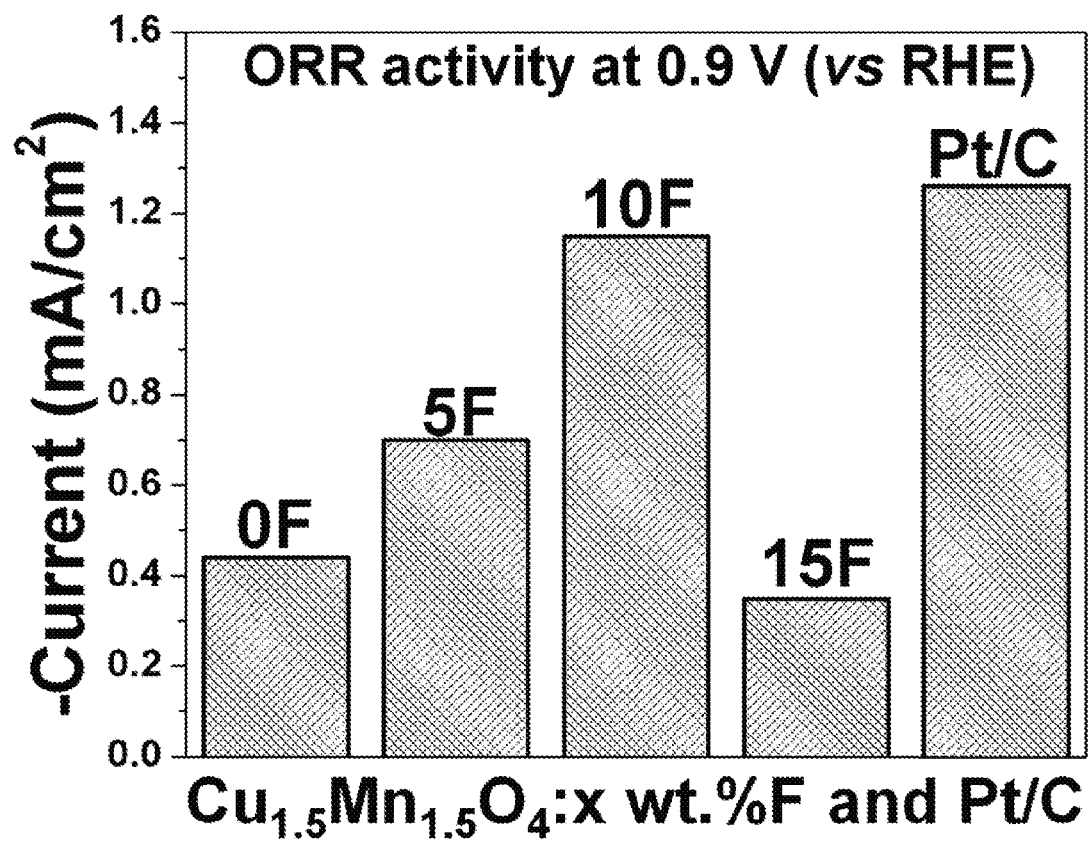
FIG. 3b is a bar graph that shows a comparison of electrochemical activity for ORR of $Cu_{1.5}Mn_{1.5}O_4$:F of varying fluorine content (total loading of 50 μg/cm²) and Pt/C (Pt loading of 30 $\mu g_{Pt}$/cm²) at 0.9 V (vs RHE)

The electrochemical activity for ORR was studied by comparing current density at 0.9 V (vs RHE, typical potential used for study of electrochemical activity for ORR) in $iR_\Omega$ corrected polarization curves obtained in $O_2$-saturated 0.5 M $H_2SO_4$ electrolyte solution at 26° C. (FIG. 3a). $Cu_{1.5}Mn_{1.5}O_4$:F exhibited excellent electrochemical activity for ORR with onset potential of ORR similar to that of Pt/C (~1±0.001 V vs RHE) mainly due to similar reaction polarization, as discussed earlier (FIG. 2d-e and FIG. 3a). The current density at 0.9 V (vs RHE) for Pt/C is ~1.26±0.0001 mA/cm$^2$ (Table 2). $Cu_{1.5}Mn_{1.5}O_4$, $Cu_{1.5}Mn_{1.5}O_4$:5F, $Cu_{1.5}Mn_{1.5}O_4$:10F and $Cu_{1.5}Mn_{1.5}O_4$:15F exhibited current density of ~0.44±0.0001 mA/cm$^2$, ~0.7±0.001 mA/cm$^2$, ~1.15±0.0001 mA/cm$^2$ and ~0.35±0.001 mA/cm$^2$ at 0.9 V (vs RHE) (FIG. 3a-b and Table 2). Thus, $Cu_{1.5}Mn_{1.5}O_4$, $Cu_{1.5}Mn_{1.5}O_4$:5F, $Cu_{1.5}Mn_{1.5}O_4$:10F and $Cu_{1.5}Mn_{1.5}O_4$:15F exhibited 35%, 56%, 92% and 28% electrochemical activity for ORR of that of Pt/C, respectively (FIG. 3b). Thus, electrochemical activity increases upon F-doping in $Cu_{1.5}Mn_{1.5}O_4$ up to 10 wt. % F content mainly due to decrease in $R_{ct}$ and Tafel slope (decrease in activation polarization) (Table 2) with the lowest obtained for $Cu_{1.5}Mn_{1.5}O_4$:10F (~15.6±0.001 $\Omega \cdot cm^2$, ~68±0.001 mV/dec in low current region (LCR) and ~123±0.001 mV/dec in high current region (HCR)) implying fast reaction kinetics for $Cu_{1.5}Mn_{1.5}O_4$:10F and then, the increase in both values for continued increase in F content above 10 wt. % indicating poor reaction kinetics. The number of electrons involved in ORR for $Cu_{1.5}Mn_{1.5}O_4$:10F determined from the Koutechy-Levich plot is 3.88, suggesting the desired direct four electron pathway of ORR for $Cu_{1.5}Mn_{1.5}O_4$:10F. In addition, $Cu_{1.5}Mn_{1.5}O_4$:10F exhibited excellent methanol tolerance for use as cathode electro-catalyst in DMFCs, superior to that of the standard Pt/C electro-catalyst.

The polarization curve of a single PEMFC full cell made of $Cu_{1.5}Mn_{1.5}O_4$:10F (total loading=0.3 mg/cm$^2$) as cathode electro-catalyst and commercial Pt/C (Alfa Aesar) as anode electro-catalyst (Pt loading=0.2 mg$_{Pt}$/cm$^2$) showed maximum power density of ~550 mW/cm$^2$ which is ~56% of that obtained using Pt/C (Pt loading=0.3 mg$_{Pt}$/cm$^2$) as cathode electro-catalyst (~990 mW/cm$^2$). This is a hallmark finding as the DOE recommendable power density (~550 mW/cm$^2$) was obtained using the novel electro-catalyst ($Cu_{1.5}Mn_{1.5}O_4$:10F) devoid of any precious or noble metals.

Figure 3C:
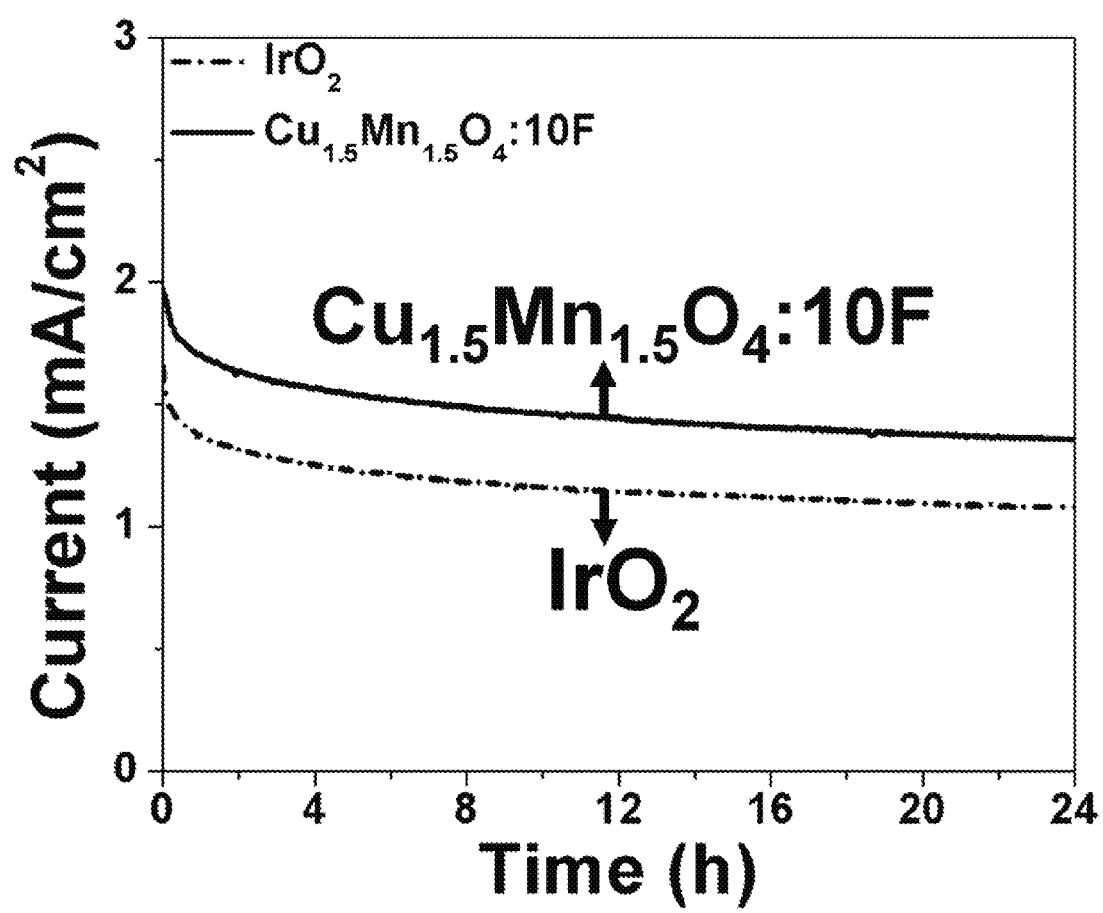
FIG. 3c is a plot that shows the variation of current density vs time for OER of $Cu_{1.5}Mn_{1.5}O_4$:10F (total loading=1 mg/cm²) and $IrO_2$ (total loading=0.15 mg/cm²) performed in 0.5 M $H_2SO_4$ solution under a constant potential of 1.55 V (vs RHE) at 40° C. for 24 hours.
Figure 3D:
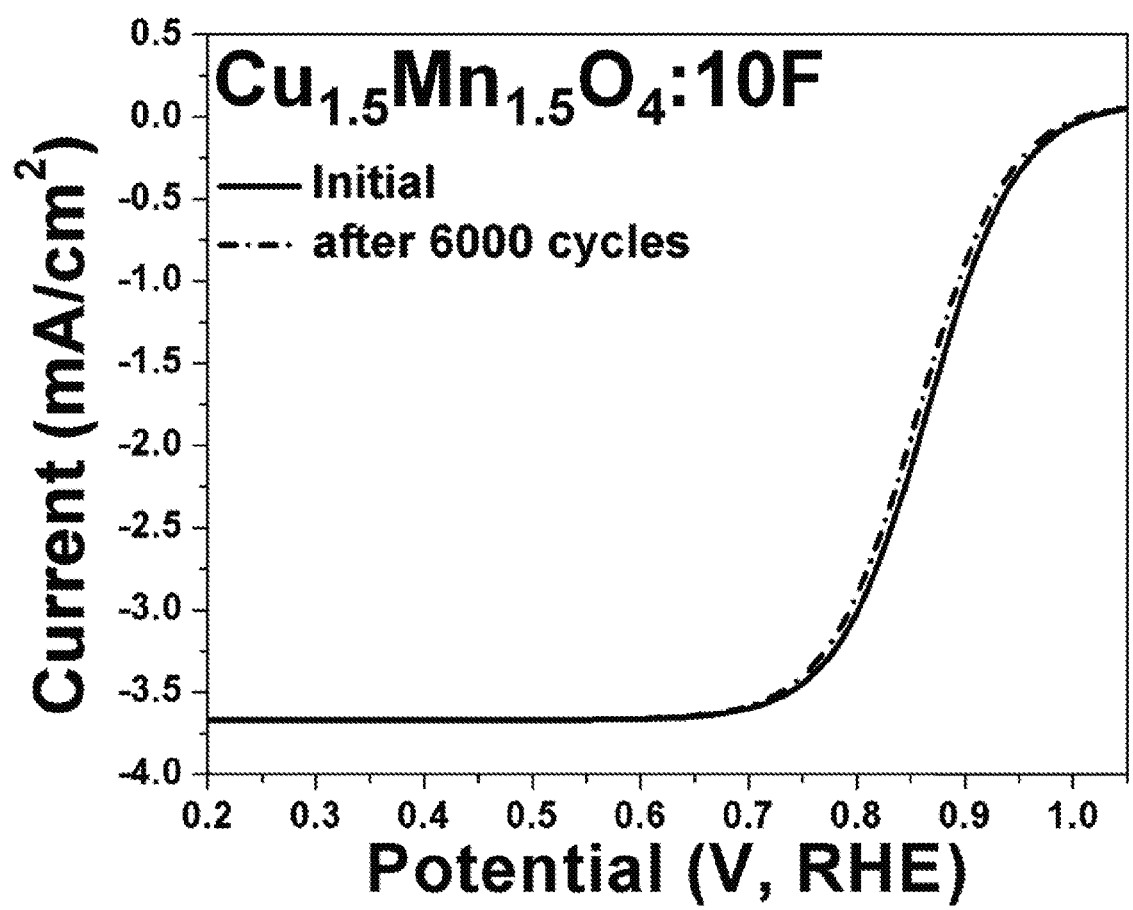
FIG. 3d is a plot that shows the $iR_\Omega$ corrected polarization curve (initial and after 6000 cycles) for ORR of $Cu_{1.5}Mn_{1.5}O_4$:10F (total loading=50 μg/cm²) obtained after stability test, obtained in $O_2$-saturated 0.5 M $H_2SO_4$ solution at 26° C. with rotation speed of 2500 rpm and scan rate of 5 mV/sec, indicating outstanding electrochemical stability with negligible loss in electrochemical activity for ORR for long term operation.

The long term electrochemical stability of $Cu_{1.5}Mn_{1.5}O_4$:10F and in-house synthesized $IrO_2$ was studied by performing chronoamperometry (CA) test wherein, the electrode was maintained at a constant voltage of ~1.55 V (vs RHE) in 0.5 M $H_2SO_4$ electrolyte for 24 h and loss in electro-catalytic activity (i.e., current density) for OER was studied (FIG. 3c). The minimal loss in current density in CA curve (similar to that of $IrO_2$) (FIG. 3c) along with minimal loss in electrochemical performance for OER after 24 h of CA test, that is negligible loss in current density for ORR after stability test for 6000 cycles (FIG. 3d), no detection of Cu/Mn in ICP analysis conducted on the electrolyte solution after stability test for OER and ORR, negligible loss in single PEMFC performance after 48 h of operation suggests the excellent long term electrochemical stability for OER and ORR of $Cu_{1.5}Mn_{1.5}O_4$:10F in acidic media.

In summary, there was demonstrated a hallmark development of novel non-noble electro-catalyst ($Cu_{1.5}Mn_{1.5}O_4$:F) with zero noble metal content with unique atomic/molecular structure exhibiting remarkable stability and outstanding electrochemical activity obtained for $Cu_{1.5}Mn_{1.5}O_4$:10F which is comparable to that of $IrO_2$ for OER and ~92% of that of Pt/C for ORR, respectively. Hence, $Cu_{1.5}Mn_{1.5}O_4$:10F provides support for replacing Pt, $IrO_2$ and thus, this is a fundamental breakthrough in the pursuit of completely non-precious electro-catalyst for economic and efficient hydrogen production from PEM water electrolysis with proficient power generation from fuel cells (PEMFCs, DMFCs).

Methods

Preparation of $Cu_{1.5}Mn_{1.5}O_4$:x Wt. % F (x=0, 5, 10, 15) Nanoparticles (NPs)

Synthesis of $MnO_2$ NPs

Manganese acetate tetrahydrate ($Mn(CH_3COO)_2 \cdot 4H_2O$, 1.5 mmol, 99.99%, Aldrich) was dissolved in 25 mL D.I. water purified by the Milli-Q system (18 MΩcm deionized water, Milli-Q Academic, Millipore). Separately, $KMnO_4$ (1 mmol) was dissolved in 25 mL D.I. water. $KMnO_4$ solution was then added to $Mn(CH_3COO)_2 \cdot 4H_2O$ solution with vigorous stirring, which immediately formed a brown slurry. After ~1 h stirring, the precipitate was obtained by filtration and then thoroughly washed with D.I. water, followed by drying at 60° C. for 2 h.

Synthesis of $Cu_{1.5}Mn_{1.5}O_4$:x wt. % F NPs

For the preparation of $Cu_{1.5}Mn_{1.5}O_4$ NPs, copper chloride dihydrate ($CuCl_2 \cdot 2H_2O$, ≥99%, Aldrich) was dissolved in D.I. water. The preparation of $Cu_{1.5}Mn_{1.5}O_4$ was performed by soaking the suitable amount of copper chloride dihydrate ($CuCl_2 \cdot 2H_2O$, ≥99%, Aldrich) aqueous solution on the surface of the as-prepared $MnO_2$ NPs. For synthesis of $Cu_{1.5}Mn_{1.5}O_4$:F, ammonium fluoride ($NH_4F$, 98%, Alfa Aesar) dissolved in D.I. water was also introduced after the addition of $CuCl_2 \cdot 2H_2O$ solution. The solution was then dried in an alumina crucible in drying oven at 60° C. for 2 h, followed by heat treatment in air at 500° C. for 4 h in order to form $Cu_{1.5}Mn_{1.5}O_4$:F of different F content. $Cu_{1.5}Mn_{1.5}O_4$:x wt. % F (x=0, 5, 10, 15) are denoted as $Cu_{1.5}Mn_{1.5}O_4$:0F, $Cu_{1.5}Mn_{1.5}O_4$:5F, $Cu_{1.5}Mn_{1.5}O_4$:10F and $Cu_{1.5}Mn_{1.5}O_4$:15F herein, respectively.

Materials Characterization

The phase analysis of electro-catalyst materials was carried out by x-ray diffraction (XRD) using Philips XPERT PRO system employing $CuK_\alpha$ (λ=0.15406 nm) radiation at an operating voltage and current of 45 kV and 40 mA, respectively. The XRD peak profile of $Cu_{1.5}Mn_{1.5}O_4$:F of different F content was analyzed using the Pseudo-Voigt function to determine the Lorentzian and Gaussian contribution of the peak. The integral breadth of the Lorentzian contribution, determined from peak profile analysis using the single line approximation method after eliminating the instrumental broadening and lattice strain contribution, was used in the Scherrer formula to calculate the particle size of $Cu_{1.5}Mn_{1.5}O_4$:F of different composition. The lattice parameter and molar volume of synthesized $Cu_{1.5}Mn_{1.5}O_4$:F of different composition have been calculated using the least square refinement techniques.

Scanning electron microscopy (SEM) was carried out to investigate the microstructure of $Cu_{1.5}Mn_{1.5}O_4$:F. Quantitative elemental analysis and distribution of elements (by elemental x-ray mapping) was obtained by utilizing the energy dispersive x-ray spectroscopy (EDX) analyzer attached with the SEM machine. Philips XL-30FEG equipped with an EDX detector system comprising of an ultrathin beryllium window and Si(Li) detector operating at 20 kV was used for the elemental and x-ray mapping analysis. Transmission electron microscopy and high resolution transmission electron microscopy (HRTEM) analysis was conducted using the JEOL JEM-2100F microscope to investigate the particle size and morphology of electro-catalyst materials. The specific surface area (SSA) of electro-catalyst materials was determined by conducting nitrogen adsorption-desorption studies and analyzing the data using the Brunauer-Emmett-Teller (BET) isotherms. The powder was first vacuum degassed and then tested using a Micromeritics ASAP 2020 instrument. Multipoint BET specific surface areas analyses have been conducted and indicated for the synthesized electro-catalyst powders (Table 1).

X-ray photoelectron spectroscopy (XPS) was used to investigate the valence states of Cu and Mn ions of $Cu_{1.5}Mn_{1.5}O_4$:F. XPS analysis was carried out using a Physical Electronics (PHI) model 32-096 X-ray source control and a 22-040 power supply interfaced to a model 04-548 X-ray source with an Omni Focus III spherical capacitance analyzer (SCA). The system is routinely operated within the pressure range of $10^{-8}$ to $10^{-9}$ Torr ($1.3 \times 10^{-6}$ to $1.3 \times 10^{-7}$ Pa). The system was calibrated in accordance with the manufacturer's procedures utilizing the photoemission lines $E_b$ of Cu $2p_{3/2}$ (932.7 eV), $E_b$ of Au $4f_{7/2}$ (84 eV) and $E_b$ of Ag $3d_{5/2}$ (368.3 eV) for a magnesium anode. All the reported intensities are experimentally determined peak areas divided by the instrumental sensitivity factors. Charge correction was obtained by referencing the adventitious C 1s peak to 284.8 eV. The presence of F in synthesized electro-catalyst materials was confirmed by collecting $^{19}F$ NMR spectra on an Avance 500 MHz Wide Bore NMR spectrometer using a 3.2 mm CP-MAS probe at a spinning speed of 14 kHz.

Electrochemical Characterization as OER Electro-Catalyst

Electrochemical characterization of $Cu_{1.5}Mn_{1.5}O_4$:X wt. % F (x=0, 5, 10, 15) nanoparticles (NPs) was performed at 40° C. (using a Fisher Scientific 910 Isotemp refrigerator circulator) on a VersaSTAT 3 (Princeton Applied Research) electrochemical workstation using a three electrode configuration in the electrolyte solution of 0.5 M sulfuric acid ($H_2SO_4$) which also served as a proton source. Prior to electrochemical testing, oxygen from the electrolyte solution was expelled by purging electrolyte solution with ultra-high-purity (UHP)-$N_2$ gas. The electro-catalyst ink was prepared using 85 wt. % electro-catalyst and 15 wt. % Nafion 117 (5 wt. % solution in lower aliphatic alcohols, Aldrich) and further sonicated. The working electrodes were prepared by spreading the electro-catalyst ink of $Cu_{1.5}Mn_{1.5}O_4$:x wt. % F (x=0, 5, 10, 15) on porous Ti foil (Alfa Aesar) with the total loading of 1 mg on 1 $cm^2$ area. A Pt wire (Alfa Aesar, 0.25 mm thick, 99.95%) was used as the counter electrode and mercury/mercurous sulfate ($Hg/Hg_2SO_4$) electrode (XR-200, Hach) that has a potential of +0.65 V with respect to normal hydrogen electrode (NHE) was used as the reference electrode. The electrochemical performance of $Cu_{1.5}Mn_{1.5}O_4$:F for OER is compared with state of the art $IrO_2$ electro-catalyst in this study. Hence, the electrochemical performance of in-house synthesized $IrO_2$ electro-catalyst was analyzed with total loading of 0.15 mg on 1 $cm^2$ area under identical operating conditions. All the potential values in this study are reported with respect to reversible hydrogen electrode (RHE), calculated from the formula: $E_{RHE}=E_{Hg/Hg2SO4}+E^0_{Hg/Hg2SO4}+0.059$ pH, wherein $E_{RHE}$ is the potential versus RHE. $E_{Hg/Hg2SO4}$ is the potential measured against the $Hg/Hg_2SO_4$ reference electrode. $E^0_{Hg2SO4}$ is the standard electrode potential of $Hg/Hg_2SO_4$ reference electrode (+0.65 V vs NHE).

The electrochemical activity of electro-catalysts for OER was determined by conducting polarization measurements in 0.5 M $H_2SO_4$ electrolyte solution at a scan rate of 5 mV/sec at 40° C. Polarization curves of different electro-catalysts were $iR_\Omega$ corrected ($R_\Omega$, the ohmic resistance was determined from electrochemical impedance spectroscopy analysis discussed later). The current density at 1.55 V (vs RHE, which is typical potential selected for comparison of electrochemical activity of electro-catalyst for OER) in $iR_\Omega$ corrected polarization curves was used for comparison of electrochemical performance of different electro-catalysts. The Tafel plot after $iR_\Omega$ correction given by the equation $\eta=a+b \log i$ (plot of overpotential $\eta$ vs log current, log i) was used to determine Tafel slope (b), which was further used to study the reaction kinetics for all electro-catalysts.

Electrochemical Impedance Spectroscopy

The ohmic resistance ($R_\Omega$) (which includes resistance from components like electrolyte, electrode) and the charge transfer resistance ($R_{ct}$) of electro-catalysts were determined from electrochemical impedance spectroscopy (EIS). The frequency range of 100 mHz-100 kHz (Amplitude=10 mV) was used for EIS, which was carried out using the electrochemical work station (VersaSTAT 3, Princeton Applied Research) in 0.5 M $H_2SO_4$ electrolyte solution at 40° C. at 1.55 V (vs RHE which is typical potential used for assessing of electrochemical activity of electro-catalyst for OER) using total loading of 1 $mg/cm^2$ for $Cu_{1.5}Mn_{1.5}O_4$:F of different F content and 0.15 $mg/cm^2$ for in-house synthesized $IrO_2$. Impedance data for OER has been modeled by using the ZView software from Scribner Associates employing the $R_s(R_eQ_l)(R_{ct}Q_{dl})$ circuit model to determine: $R_s$=Resistance faced at high frequency due to charge transfer in electrolyte solution; $R_e$=Resistance for electron transfer from the electrode to current collector (Ti foil); $R_{ct}$=Charge transfer resistance (i.e., polarization resistance); $Q_l$=Constant phase element; and $Q_{dl}$=Contribution from both double layer capacitance and pseudocapacitance. The ohmic resistance ($R_\Omega$) obtained from the EIS was used for $iR_\Omega$ ($iR_s+iR_e$) correction in the polarization curves of electro-catalysts.

Electrochemical Stability Test

The electrochemical stability of $Cu_{1.5}Mn_{1.5}O_4$:10F electro-catalyst (total loading=1 $mg/cm^2$) for long term operation was studied by conducting chronoamperometry (CA) (current vs time) for 24 h using 0.5 M $H_2SO_4$ as the electrolyte solution at 40° C. at constant voltage of 1.55 V (vs RHE). For comparison, CA test was also conducted for in-house synthesized $IrO_2$ (total loading=0.15 $mg/cm^2$). The electrolyte ($H_2SO_4$) solution collected after 24 h of CA testing of electro-catalyst material was analyzed using inductively coupled plasma optical emission spectroscopy (ICP-OES, iCAP 6500 duo Thermo Fisher) to determine the concentration of elements leached out in the electrolyte solution from the electrode. This is important as the concentration of elements in the electrolyte solution can be correlated to the electrochemical stability of electro-catalyst.

Electrochemical Characterization as ORR Electro-Catalyst

The electrochemical characterization was carried out using a rotating disk electrode (RDE) setup. The electrocatalyst ink (85 wt. % electro-catalyst and 15 wt. % Nafion 117) was sonicated and applied to a glassy carbon (GC) disk (geometric area=0.19 $cm^2$). After solvent evaporation, the GC surface had a thin layer of electro-catalyst, which served as the working electrode. The total loading of $Cu_{1.5}Mn_{1.5}O_4$:x wt. % F (x=0, 5, 10, 15) was 50 $\mu g/cm^2$. The electrochemical performance of $Cu_{1.5}Mn_{1.5}O_4$:F for ORR is compared with state of the art Pt/C electro-catalyst in this study. Hence, the electrochemical performance of commercially obtained 40% Pt/C electro-catalyst (Alfa Aesar) was analyzed with Pt loading of 30 $\mu g_{Pt}$ on 1 $cm^2$ area under identical operating conditions. A Pt wire (Alfa Aesar, 0.25 mm thick, 99.95%) was used as the counter electrode and $Hg/Hg_2SO_4$ was used as the reference electrode (+0.65 vs NHE).

Electrochemical characterization was conducted in an electrochemical workstation (VersaSTAT 3, Princeton Applied Research) using a three electrode cell configuration at 26° C. (using a Fisher Scientific 910 Isotemp refrigerator circulator). The cyclic voltammetry was conducted in $N_2$-saturated 0.5 M $H_2SO_4$ electrolyte solution by scanning the potential between 0 V (vs RHE) and 1.23 V (vs RHE) at scan rate of 5 mV/sec. ORR measurement was carried out by performing polarization studies in $O_2$-saturated 0.5 M $H_2SO_4$ electrolyte solution at 26° C. using rotation speed of 2500 rpm and scan rate of 5 mV/sec. Polarization was conducted in multiple small potential steps on the RDE to reduce the contribution by the charging current and the current measurement was performed at the end of each step.[3,4] The current density at 0.9 V (vs RHE, the typical potential for assessing electrochemical activity of electro-catalysts for ORR) in $iR_\Omega$ corrected ($R_\Omega$, the ohmic resistance was determined from electrochemical impedance spectroscopy analysis described below) polarization curves of electro-catalysts was used to compare the electrochemical performance of the different electro-catalyst materials. The Tafel plot after $iR_\Omega$ correction given by the equation $\eta=a+b \log i$ (plot of overpotential $\eta$ vs log current, log i) and the corresponding Tafel slope (b) has been used to study the reaction kinetics of ORR. The Koutechy-Levich equation was used to determine the number of electrons (n) involved in the reaction: $i^{-1}=i_k^{-1}+i_L^{-1}$, wherein $i_L=0.620nFA_e D_O^{2/3}\omega^{1/2}\nu^{-1/6}C_o^*$. Here, $i_L$ is the limiting current (A, Ampere) at 0.6 V (vs RHE), $i_k$ is the kinetic current (A, Ampere) observed in the absence of any mass transfer limitation, F is Faraday constant (96489 C/mol), $A_e$ is the geometric area of electrode (0.19 $cm^2$), Do is diffusivity of $O_2$ in 0.5 M $H_2SO_4$ solution (2.2×10$^{-5}$ $cm^2$/sec), ω is rotation speed (rad/sec), ν is the kinematic viscosity of water (0.01 $cm^2$/sec) and $C_o^*$ is the saturated concentration of $O_2$ in 0.5 M $H_2SO_4$ solution (0.25×10$^{-6}$ mol/$cm^3$).

Electrochemical Impedance Spectroscopy

Electrochemical impedance spectroscopy (EIS) was carried out to determine the ohmic resistance ($R_\Omega$) (which includes the resistance of various components including, electrolyte and electrode) and charge transfer resistance (or polarization resistance) ($R_{ct}$) of electro-catalysts. EIS has been conducted in the frequency range of 100 mHz-100 kHz (Amplitude=10 mV) at 0.9 V (vs RHE which is typical potential for assessing electro-catalyst activity for ORR) in $O_2$-saturated 0.5 M $H_2SO_4$ solution at 26° C. using the electrochemical work station (VersaSTAT 3, Princeton Applied Research). The experimentally obtained EIS plot was fitted using the ZView software from Scribner Associates with a circuit model $R_\Omega(R_{ct}Q_lW_o)$, where $Q_l$ is constant phase element and $W_o$ is open circuit terminus Warburg element. $R_\Omega$ was used for ohmic loss correction ($iR_\Omega$) in the polarization curves of electro-catalysts.

Methanol Tolerance Test

Methanol tolerance test was carried out for electro-catalyst by performing polarization in $O_2$-saturated 0.5 M $H_2SO_4$ electrolyte solution with presence of 1 M methanol at rotation speed of 2500 rpm and scan rate of 5 mV/sec at 26° C.

Electrochemical Stability/Durability Test

The electrochemical stability/durability of electro-catalyst for long term operation was studied by performing cyclic voltammetry by scanning potential between 0.6 V (vs RHE) and 1.23 V (vs RHE) in $N_2$-saturated 0.5 M $H_2SO_4$ electrolyte solution at 26° C. at scan rate of 5 mV/sec for 6000 cycles, followed by conducting polarization in $O_2$-saturated 0.5 M $H_2SO_4$ solution after 6000 cycles at 26° C. using rotation speed of 2500 rpm and scan rate of 5 mV/sec. Elemental analysis of the electrolyte was performed after 6000 cycles by inductively coupled plasma optical emission spectroscopy (ICP-OES, iCAP 6500 duo Thermo Fisher) to determine the amount of elements leached out into the electrolyte solution from the electrode providing information about the electrochemical stability of the electro-catalyst.

Membrane Electrode Assembly (MEA) Preparation and Single Cell Test Analysis

The anode and cathode electro-catalyst ink was prepared consisting of 85 wt. % electro-catalyst and 15 wt. % Nafion 117 solution (5 wt. % solution in lower aliphatic alcohols, Sigma-Aldrich). For anode, Pt loading of commercial 40% Pt/C (Alfa Aesar) electro-catalyst was 0.2 $mg_{Pt}/cm^2$. For cathode, the total loading of 0.3 $mg/cm^2$ was used for $Cu_{1.5}Mn_{1.5}O_4$:10F electro-catalyst. For comparison, 40% Pt/C (Alfa Aesar) was also studied as cathode electro-catalyst in single cell test using Pt loading of 0.3 $mg_{Pt}/cm^2$. The electrodes were prepared by spreading the electro-catalyst ink on teflonized carbon paper. For the single cell testing, a membrane electrode assembly was fabricated by using a Nafion 115 membrane which was sandwiched between the anode and cathode. The Nafion 115 membrane was pretreated first with 3 wt. % hydrogen peroxide solution to its boiling point to oxidize any organic impurities. Subsequently, it was boiled in D.I. water followed by immersion in boiling 0.5 M sulfuric acid solution to eliminate impurities. Finally, it was washed multiple times in D.I water to remove any traces of remnant acid. This membrane was then stored in D.I. water to avoid dehydration. The sandwiching of Nafion 115 membrane between anode and cathode was carried out by hot-pressing in a 25T hydraulic lamination hot press with dual temperature controller (MTI Corporation) at a temperature of 125° C. and pressure of 40 atm applied for 30 sec to ensure good contact between the electrodes and the membrane. This MEA was then used in the single cell test analysis, carried out for 48 hours using fuel cell test set up obtained from Electrochem Incorporation at 80° C. and 0.1 MPa with UHP-$H_2$ (200 ml/min) and UHP-$O_2$ (300 ml/min) as reactant gases.

Computational Methodology

The overall electro-catalytic activity of the $Cu_{1.5}Mn_{1.5}O_4$ electro-catalyst was expected to depend on its electronic structure. The effect of compositions on the electronic structure and the electro-catalytic activity of the electro-catalyst can be well-understood from the theoretical considerations. The computational component of this study was to investigate the electronic structure of pure $Cu_{1.5}Mn_{1.5}O_4$ and F-doped $Cu_{1.5}Mn_{1.5}O_4$. The total energy, electronic and optimized crystal structures as well as total and projected densities of electronic states for pure and F-doped $Cu_{1.5}Mn_{1.5}O_4$ were calculated using the first principles approach within the density functional theory (DFT). The electronic structure of the stable surfaces for all electro-catalysts were calculated in this study and the positions of corresponding d-band centers were obtained as a first moment of $n_d(E): \varepsilon_d = \int n_d(E)EdE/\int n_d(E)dE$, where $n_d(E)$ is the projected d-band density of states of the corresponding materials. For comparative purpose, pure platinum as a gold standard electro-catalyst for ORR in fuel cells (PEMFCs, DMFCs) as well as $IrO_2$ widely used for OER in PEM electrolysis were also considered in the present study.

For calculating the total energies, electronic structure and density of electronic states, the Vienna Ab-initio Simulation Package (VASP) was used within the projector-augmented wave (PAW) method and the spin-polarized generalized gradient approximation (GGA) for the exchange-correlation energy functional in a form suggested by Perdew and Wang. This program calculates the electronic structure and via the Hellmann-Feynman theorem, the inter-atomic forces are determined from first-principles. Standard PAW potentials were employed for the Cu, Mn, O, F, Pt and Ir potentials containing eleven, seven, six, seven, ten, and nine valence electrons, respectively. The $Cu_{1.5}Mn_{1.5}O_4$ at room temperature adopts a complex cubic crystal structure with $P4_132$ symmetry and space group #213. The bulk elementary unit cell contains 56 atoms corresponding to 8 formula units. All surface calculations for pure and F-doped oxides were done for (100) surface with thirteen atomic layer slab separated by its image in [100] direction by vacuum layer. Both the slab and vacuum layers have the same thickness of ~12.5 A°. In case of F-doped oxide, 15 F-atoms were randomly distributed over six 8-atomic oxygen layers in the slab, thus representing $Cu_{1.5}Mn_{1.5}O_{2.75}F_{1.25}$ composition corresponding to 9.7 wt. % of F. Also, a (111) fcc surface calculation for pure Pt and (110) rutile type surface calculation for $IrO_2$ has been conducted for comparative purposes.

For all the electro-catalysts considered in this study, the plane wave cutoff energy of 520 eV was chosen to maintain a high accuracy of the total energy calculations. The lattice parameters and internal positions of atoms were fully optimized employing the double relaxation procedure and consequently, the minima of the total energies with respect to the lattice parameters and internal ionic positions were determined. This geometry optimization was obtained by minimizing the Hellman-Feynman forces via a conjugate gradient method, so that the net forces applied on every ion in the lattice are close to zero. The total electronic energies were converged within $10^{-5}$ eV/un.cell resulting in the residual force components on each atom to be lower than 0.01 eV/Å/atom, thus allowing for an accurate determination of the internal structural parameters for the oxide. The Monkhorst-Pack scheme was used to sample the Brillouin Zone (BZ) and generate the k-point grid for all the materials considered in the present patent application. A choice of the appropriate number of k-points in the irreducible part of the BZ was based on convergence of the total energy to 0.1 meV/atom.

The invention claimed is:
1. A nanostructured, noble metal-free, electro-catalyst composition in an acidic electrolyte in a proton exchange membrane-based system, comprising:
a non-noble metal oxide in a form selected from the group consisting of nano-particle, nanocrystalline thin film, nanorod, nanoshell, nanoflake, nanotube, nanoplate, nanosphere, nanowhisker and combinations thereof, of a general formula 1:

$$(a_x b_y)O_z{:}wc \quad (I)$$

wherein, a is Cu, Zn, Sc, Fe, Co, Ti, V, Ni, Cr, Ta, Sn, Nb, W, Mo, Y, La, Ce, Nd, Er, Gd, Yb or mixtures thereof; b is Mn; O is oxygen; c represents dopant that is an element in Groups III, V, VI and VII of the Periodic Table or mixtures thereof; x and y are each a number greater than 0 and less than or equal to 2, x and y being the same or different; z is a number that is greater than 0 and less than or equal to 4, and w is from greater than 0% by weight to about 20% by weight, based on total weight of the composition;

wherein, the noble metal-free electro-catalyst is absent of any noble metal, and wherein the proton exchange membrane-based system is an oxygen evolution reaction in an acid mediated proton exchange membrane-based water electrolyzer, or an oxygen reduction reaction in an acid mediated proton exchange membrane-based fuel cell.

2. The composition of claim 1, wherein the dopant is selected from the group consisting of fluorine, chlorine, bromine, iodine, sulfur, selenium, tellurium, nitrogen, phosphorus, arsenic, antimony, bismuth, aluminum, boron and mixtures thereof.

3. The composition of claim 1, wherein the dopant is present is an amount from about 10 to about 15 weight percent based on total weight of the composition.

4. The composition of claim 1, wherein the non-noble metal is a binary metal oxide comprising copper oxide and manganese oxide, and the dopant is fluorine.

5. The composition of claim 1, wherein x is 1.5, y is 1.5, z is 4 and w is 5, 10 or 15 percent by weight.

6. The composition of claim 1, wherein x is 1.5, y is 1.5, z is 2.75 and w is 1.25 by formula unit.

* * * * *